(12) United States Patent
Ren et al.

(10) Patent No.: US 12,309,090 B2
(45) Date of Patent: May 20, 2025

(54) INFORMATION COMMUNICATION METHOD AND DEVICE

(71) Applicant: DATANG MOBILE COMMUNICATIONS EQUIPMENT CO., LTD., Beijing (CN)

(72) Inventors: Bin Ren, Beijing (CN); Ren Da, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 516 days.

(21) Appl. No.: 17/775,739

(22) PCT Filed: Nov. 11, 2020

(86) PCT No.: PCT/CN2020/128194
§ 371 (c)(1),
(2) Date: May 10, 2022

(87) PCT Pub. No.: WO2021/104025
PCT Pub. Date: Jun. 3, 2021

(65) Prior Publication Data
US 2022/0407639 A1    Dec. 22, 2022

(30) Foreign Application Priority Data

Nov. 25, 2019  (CN) .......................... 201911168857.3

(51) Int. Cl.
*H04L 5/00* (2006.01)
*H04W 64/00* (2009.01)
(52) U.S. Cl.
CPC ............. *H04L 5/005* (2013.01); *H04W 64/00* (2013.01)
(58) Field of Classification Search
None
See application file for complete search history.

(56) References Cited

U.S. PATENT DOCUMENTS

| 2014/0073356 | A1 | 3/2014 | Siomina et al. |
| 2017/0331609 | A1* | 11/2017 | Xia ........................ H04W 24/02 |

(Continued)

FOREIGN PATENT DOCUMENTS

| CN | 101370260 A | 2/2009 |
| CN | 104349454 A | 2/2015 |

(Continued)

OTHER PUBLICATIONS

Huawei et al., Considerations on DL procedures for NR positioning, 3GPP TSG-RAN WG2, R2-1914980, Reno, NV, USA, Nov. 2019.

(Continued)

*Primary Examiner* — Phirin Sam
(74) *Attorney, Agent, or Firm* — Meunier Carlin & Curfman LLC

(57) ABSTRACT

Disclosed are an information transmission method and device, for determining positioning reference signal resource configuration information and a positioning technical scheme by means of a negotiation process between a positioning server and other nodes, so as to avoid that neighboring base stations may send positioning reference signals on the same time and frequency resources, causing the positioning reference signals of neighboring base stations to interfere with each other, resulting in the degradation of downlink positioning measurement performance, and to enable each base station to optimize the configuration of the positioning reference signal according to the positioning performance requirements of a terminal, thereby improving the positioning performance. The information transmission method provided by the present application comprises: determining positioning reference signal resource configuration information and a positioning technical scheme by means of a negotiation process between a positioning server and other nodes; and notifying the other nodes of the (Continued)

positioning reference signal resource configuration information and the positioning technical scheme.

18 Claims, 7 Drawing Sheets

(56) References Cited

U.S. PATENT DOCUMENTS

| | | | |
|---|---|---|---|
| 2017/0346615 A1* | 11/2017 | Liu | H04L 5/0098 |
| 2018/0139763 A1 | 5/2018 | Bitra et al. | |
| 2018/0343635 A1 | 11/2018 | Edge et al. | |
| 2019/0053010 A1 | 2/2019 | Edge et al. | |
| 2019/0190673 A1* | 6/2019 | Kwak | H04B 7/0417 |
| 2020/0014515 A1* | 1/2020 | Qin | H04L 5/0051 |
| 2020/0374658 A1 | 11/2020 | Chang | |
| 2021/0067302 A1* | 3/2021 | Wang | H04L 5/0053 |
| 2021/0218516 A1* | 7/2021 | Chen | G01S 5/0018 |
| 2021/0359813 A1* | 11/2021 | Huang | H04W 24/04 |
| 2021/0377906 A1* | 12/2021 | Bao | H04W 24/10 |
| 2022/0045817 A1* | 2/2022 | Mazzarese | H04W 72/23 |
| 2024/0377521 A1* | 11/2024 | Tadayon | H04W 64/00 |

FOREIGN PATENT DOCUMENTS

| | | |
|---|---|---|
| CN | 109923842 A | 6/2019 |
| EP | 3448099 A1 | 2/2019 |
| WO | 2022060493 A1 | 3/2022 |

OTHER PUBLICATIONS

Nokia et al, On-demand and dynamic PRS configuration for DL-TDOA, 3GPP TSG-RAN WG2, R2-1916106, Reno, NV, USA, Nov. 2019.

* cited by examiner

INFORMATION COMMUNICATION METHOD AND DEVICE

CROSS-REFERENCE OF RELATED APPLICATIONS

The present application is a national phase entry under 35 U.S.C. § 371 of International Application No. PCT/CN2020/128194, filed on Nov. 11, 2020, which claims the priority from Chinese Patent Application No. 201911168857.3, filed with the Chinese Patent Office on Nov. 25, 2019 and entitled "Information Communication Method and Apparatus", which is hereby incorporated by reference in its entirety.

TECHNICAL FIELD

The present application relates to the field of communication technologies, and particularly to an information communication method and apparatus.

BACKGROUND

The Down Link (DL) Observed Time Difference Of Arrival (OTDOA) positioning method, for example as shown in FIGS. 1 and 2 which show a common flow diagram in the current scheme, includes the following 11 steps.

Step 1: a User Equipment (UE) is in the Radio Resource Control Connected (RRC_CONNECTED) state after the UE establishes a connection with a base station.

Step 2: a Location Management Function (LMF) sends a Request Capabilities message to the UE to request the UE to notify the LMF of the positioning function that the UE can support.

Step 3: the UE sends a Provide Capabilities message to respond to the LMF, where the Provide Capabilities message reports the positioning capability of the UE supporting the OTDOA.

Step 4: when the downlink positioning assistance data is required, the UE sends a Request Assistance Data message to the LMF, where this message is used to request the LMF to provide the OTDOA assistance data.

Step 5: the LMF sends a Request OTDOA Information message to the base station, where this message is used to request the base station to provide the downlink positioning assistance data, such as Down Link (DL) Positioning Reference Signal (PRS) configuration data.

Step 6: the base station sends an OTDOA information Response message to the LMF to provide the LMF with the requested downlink positioning assistance data, including the PRS configuration data.

Step 7: the LMF provides the positioning assistance data requested by the UE in the Provide assistance data message, which carries the DL RS configuration data.

Step 8: the base station sends a DL PRS signal to the UE.

Step 9: the UE measures the downlink signal using the positioning assistance data (for example: PRS configuration data) to obtain positioning measurements, for example: Reference Signal Time Difference (RSTD), Reference Signal Received Power (RSRP).

Step 10: the UE sends a Provide Location Information message to the LMF, where this message includes the positioning measurements (for example: RSTD, RSRP) obtained by measuring the DL PRS.

Step 11: the LMF determines the location of the UE according to the PRS configuration information, the positions of the sending antennas of each base station, and the positioning measurements reported by the UE.

Here, in the current Third Generation Partnership Project (3GPP) protocol, the Request OTDOA information message sent by the LMF to the base station in step 5 only triggers the base station to provide the requested downlink positioning assistance data to the LMF but no configuration information of the suggested downlink positioning reference signal.

To sum up, the request message sent by the LMF to the base station in step 5 of FIG. 2 only triggers the base station to provide the requested downlink positioning assistance data to the LMF. After the base station receives the request message from LMF, each base station independently determines the configuration of the DL PRS signal. Such method has the following issues: the adjacent base stations may send the DL PRSs on the same time and frequency resources, so that the DL PRS signals of the adjacent base stations interfere with each other, resulting in the degradation of the performance of the downlink positioning measurements; and each base station cannot configure the DL PRS signal optimally according to the positioning performance requirements of the UE.

SUMMARY

Embodiments of the present application provide an information communication method and apparatus, so as to determine the positioning reference signal resource configuration information and the positioning scheme through a negotiation process between a Location Management Function (LMF) and other node, thereby avoiding the problem that adjacent base stations may send the positioning reference signals on the same time and frequency resources so that the positioning reference signals of the adjacent base station interfere with each other to cause the degradation of the performance of the downlink positioning measurements; and this method and apparatus can also support each base station to configure the positioning reference signal optimally according to the positioning performance requirements of the terminal, thereby improving the positioning performance.

On the LMF side, an information communication method provided by an embodiment of the present application includes:
   determining positioning reference signal resource configuration information and a positioning scheme through a negotiation process between a LMF and other node; where the negotiation process is an interaction process of positioning related information;
   notifying the other node of the positioning reference signal resource configuration information and the positioning scheme.

In this method, the positioning reference signal resource configuration information and the positioning scheme are determined through the negotiation process between the LMF and other node; and the other node is notified of the positioning reference signal resource configuration information and the positioning scheme, where the other node includes a base stations and/or a terminal, thereby avoiding the problem that adjacent base stations may send the positioning reference signals on the same time and frequency resources so that the positioning reference signals of the adjacent base station interfere with each other to cause the degradation of the performance of the downlink positioning measurements; and this method can also support each base station to configure the positioning reference signal optimally according to the positioning performance requirements of the terminal, thereby improving the positioning performance.

Optionally, the other node includes a base stations and/or a terminal.

Optionally, the method further includes:
receiving a positioning report sent by the other node, where the positioning report is obtained by the other node through measuring a positioning reference signal based on the positioning reference signal resource configuration information.

Optionally, the method further includes:
determining a terminal location based on the positioning report.

Optionally, the positioning report includes a positioning measurement and measurement quality obtained by measuring the positioning reference signal and reported by the other node.

Optionally, determining positioning reference signal resource configuration information and a positioning scheme through a negotiation process between a LMF and other node, specifically includes:
determining first positioning reference signal resource configuration information and a first positioning scheme according to a first predefined criterion for a first negotiation process.

Optionally, determining positioning reference signal resource configuration information and a positioning scheme through a negotiation process between a LMF and other node, specifically includes:
judging whether current positioning reference signal resource configuration information and/or positioning scheme is reasonable according to a second predefined criterion for a non-first negotiation process, and determining to adopt the reasonable current positioning reference signal resource configuration information and/or positioning scheme;
where the reasonable current positioning reference signal resource configuration information is the first positioning reference signal resource configuration information, or second positioning reference signal resource configuration information re-determined according to a third predefined criterion; and the reasonable current positioning scheme is the first positioning scheme, or a second positioning scheme re-determined according to the third predefined criterion.

Optionally, notifying the other node of the positioning reference signal resource configuration information and the positioning scheme, includes: notifying the other node of the reasonable current positioning reference signal resource configuration information and current positioning scheme determined according to the second predefined criterion.

Optionally, if it is determined that the current positioning reference signal resource configuration information is unreasonable according to the second predefined criterion, the second positioning reference signal resource configuration information and/or the second positioning scheme is/are further determined according to the third predefined criterion.

Optionally, the first predefined criterion includes:
determining the first positioning reference signal resource configuration information according to lowest positioning performance of all terminals or a part of terminals covered by a base station associated with the LMF as well as a preconfigured mapping relationship between positioning reference signal resources and positioning performance.

Optionally, the second predefined criterion includes: determining that the second positioning reference signal resource configuration information and the second positioning scheme are reasonable in response to one or a combination of following conditions being satisfied; otherwise, determining that the second positioning reference signal resource configuration information and the second positioning scheme are unreasonable:
condition 1: measurement quality is higher than a preset measurement quality threshold;
condition 2: a measurement variance is less than a preset threshold of the measurement variance; or
condition 3: a normalized relative position error between a calculation result of a terminal position obtained based on a $3^{rd}$ Generation Partnership Project (3GPP) positioning scheme and a calculation result of a terminal position obtained based on an Assisting-Global Navigation Satellite System (A-GNSS) positioning scheme is less than a preset position error threshold.

Optionally, the third predefined criterion includes:
determining the second positioning reference signal resource configuration information and/or the second positioning scheme according to actual positioning performance of a terminal in a base station associated with the LMF as well as a preconfigured mapping relationship between positioning reference signal resources and positioning performance of positioning schemes.

Correspondingly, on the other node side such as the terminal side and the base station side, an information communication method provided by an embodiment of the present application includes:
receiving positioning reference signal resource configuration information and a positioning scheme sent by a Location Management Function (LMF); where the positioning reference signal resource configuration information and the positioning scheme are determined through a negotiation process between the LMF and other node; where the negotiation process is an interactive process of positioning related information;
sending the positioning related information based on the positioning reference signal resource configuration information and a type of the positioning scheme.

Optionally, the positioning scheme is one of following schemes:
a downlink-based positioning scheme;
an uplink-based positioning scheme; or
an uplink-and-downlink-based positioning scheme.

Optionally, if the positioning scheme is a downlink-based positioning scheme, then sending the positioning related information specifically includes:
receiving and measuring a downlink positioning reference signal sent by a base station according to downlink positioning reference signal resource configuration information received from the LMF, and obtaining a downlink positioning measurement and measurement quality;
sending the downlink positioning measurement and the measurement quality to the LMF as a positioning report.

Optionally, if the positioning scheme is an uplink-based positioning scheme, then sending the positioning related information specifically includes:
sending an uplink positioning reference signal to a base station according to uplink positioning reference signal resource configuration information received from the LMF or the base station.

Optionally, if the positioning scheme is an uplink-and-downlink-based positioning scheme, then sending the positioning related information specifically includes:

receiving a downlink positioning reference signal sent by a base station and measuring it in combination with an uplink positioning reference signal according to downlink positioning reference signal resource configuration information and uplink positioning reference signal resource configuration information received from the LMF, and obtaining a positioning measurement of a combination of uplink and downlink on a terminal side and measurement quality;

sending the positioning measurement and the measurement quality of the combination of uplink and downlink at the terminal side to the LMF as the positioning report.

Optionally, if the positioning scheme is a downlink-based positioning scheme, the sending the positioning related information includes:

sending a downlink positioning reference signal to a terminal according to downlink positioning reference signal resource configuration information received from the LMF.

Optionally, if the positioning scheme is an uplink-based positioning scheme, the sending the positioning related information includes:

receiving and measuring an uplink positioning reference signal sent by a terminal according to uplink positioning reference signal resource configuration information received from the LMF, and obtaining an uplink positioning measurement and measurement quality;

reporting the uplink positioning measurement and the measurement quality to the LMF as a positioning report.

Optionally, if the positioning scheme is an uplink-and-downlink-based positioning scheme, then sending the positioning related information includes:

receiving an uplink positioning reference signal sent by a terminal and measuring it in combination with a sending moment of a downlink positioning reference signal according to downlink positioning reference signal resource configuration information and uplink positioning reference signal resource configuration information received from the LMF, to obtain a positioning measurement and measurement quality of a combination of uplink and downlink at a base station side;

sending the positioning measurement and the measurement quality of the combination of uplink and downlink at the base station side to the LMF as a positioning report.

Optionally, the downlink reference signal includes one or a combination of: a New Radio Positioning Reference Signal (NR PRS), a Channel State Information-Reference Signal (CSI-RS), or a Synchronization Signal/Physical Broadcast Channel Block (SSB).

Optionally, the uplink reference signal includes an UpLink Sounding Reference Signal (UL SRS).

Optionally, the positioning scheme includes one of following positioning schemes: various downlink-based positioning schemes, uplink-based positioning schemes, and uplink-and-downlink-based positioning schemes supported by 3GPP.

On the LMF side, an information communication device provided by an embodiment of the present application includes:

a determining unit configured to determine positioning reference signal resource configuration information and a positioning scheme through a negotiation process between a LMF and other node; where the negotiation process is an interaction process of positioning related information;

a notification unit configured to notify the other node of the positioning reference signal resource configuration information and the positioning scheme.

Optionally, the other node includes a base stations and/or a terminal.

Optionally, the notification unit is further configured to:

receive a positioning report sent by the other node, where the positioning report is obtained by the other node through measuring a positioning reference signal based on the positioning reference signal resource configuration information.

Optionally, the notification unit is further configured to:

determine a terminal location based on the positioning report.

Optionally, the positioning report includes a positioning measurement and measurement quality obtained by measuring the positioning reference signal and reported by the other node.

Optionally, when determining positioning reference signal resource configuration information and a positioning scheme through a negotiation process between a LMF and other node, the determining unit is specifically configured to:

determine first positioning reference signal resource configuration information and a first positioning scheme according to a first predefined criterion for a first negotiation process.

Optionally, when determining positioning reference signal resource configuration information and a positioning scheme through a negotiation process between a LMF and other node, the determining unit is configured to:

judge whether current positioning reference signal resource configuration information and/or positioning scheme is reasonable according to a second predefined criterion for a non-first negotiation process, and determine to adopt the reasonable current positioning reference signal resource configuration information and/or positioning scheme;

where the reasonable current positioning reference signal resource configuration information is the first positioning reference signal resource configuration information, or second positioning reference signal resource configuration information re-determined according to a third predefined criterion; and the reasonable current positioning scheme is the first positioning scheme, or a second positioning scheme re-determined according to the third predefined criterion.

Optionally, when notifying the other node of the positioning reference signal resource configuration information and the positioning scheme, the notification unit is specifically configured to:

notify the other node of the reasonable current positioning reference signal resource configuration information and current positioning scheme determined according to the second predefined criterion.

Optionally, if it is determined that the current positioning reference signal resource configuration information is unreasonable according to the second predefined criterion, the second positioning reference signal resource configuration information and/or the second positioning scheme is/are further determined according to the third predefined criterion.

Optionally, the first predefined criterion includes:
  determining the first positioning reference signal resource configuration information according to lowest positioning performance of all terminals or a part of terminals covered by a base station associated with the LMF as well as a preconfigured mapping relationship between positioning reference signal resources and positioning performance.

Optionally, the second predefined criterion includes:
determining that the second positioning reference signal resource configuration information and the second positioning scheme are reasonable in response to one or a combination of following conditions being satisfied; otherwise, determining that the second positioning reference signal resource configuration information and the second positioning scheme are unreasonable:
  condition 1: measurement quality is higher than a preset measurement quality threshold;
  condition 2: a measurement variance is less than a preset threshold of the measurement variance; or
  condition 3: a normalized relative position error between a calculation result of a terminal position obtained based on a 3GPP positioning scheme and a calculation result of a terminal position obtained based on an A-GNSS positioning scheme is less than a preset position error threshold.

Optionally, the third predefined criterion includes:
  determining the second positioning reference signal resource configuration information and/or the second positioning scheme according to actual positioning performance of a terminal in a base station associated with the LMF as well as a preconfigured mapping relationship between positioning reference signal resources and positioning performance of positioning schemes.

At the terminal side and the base station side, an information communication device provided by an embodiment of the present application includes:
  a receiving unit configured to receive positioning reference signal resource configuration information and a positioning scheme sent by a LMF; where the positioning reference signal resource configuration information and the positioning scheme are determined through a negotiation process between the LMF and other node; where the negotiation process is an interactive process of positioning related information;
  a sending unit configured to send the positioning related information based on the positioning reference signal resource configuration information and a type of the positioning scheme.

Optionally, the positioning scheme is one of following schemes:
  a downlink-based positioning scheme;
  an uplink-based positioning scheme; or
  an uplink-and-downlink-based positioning scheme.

Optionally, if the positioning scheme is a downlink-based positioning scheme, the sending the positioning related information includes:
  receiving and measuring a downlink positioning reference signal sent by a base station according to downlink positioning reference signal resource configuration information received from the LMF, and obtaining a downlink positioning measurement and measurement quality;
  sending the downlink positioning measurement and the measurement quality to the LMF as a positioning report.

Optionally, if the positioning scheme is an uplink-based positioning scheme, the sending the positioning related information includes:
  sending an uplink positioning reference signal to a base station according to uplink positioning reference signal resource configuration information received from the LMF or the base station.

Optionally, if the positioning scheme is an uplink-and-downlink-based positioning scheme, the sending the positioning related information includes:
  receiving a downlink positioning reference signal sent by a base station and measuring it in combination with an uplink positioning reference signal according to downlink positioning reference signal resource configuration information and uplink positioning reference signal resource configuration information received from the LMF, and obtaining a positioning measurement of a combination of uplink and downlink on a terminal side and measurement quality;
  sending the positioning measurement and the measurement quality of the combination of uplink and downlink at the terminal side to the LMF as a positioning report.

Optionally, if the positioning scheme is a downlink-based positioning scheme, then sending the positioning related information specifically includes:
  sending a downlink positioning reference signal to a terminal according to downlink positioning reference signal resource configuration information received from the LMF.

Optionally, if the positioning scheme is an uplink-based positioning scheme, then sending the positioning related information specifically includes:
  receiving and measuring an uplink positioning reference signal sent by a terminal according to uplink positioning reference signal resource configuration information received from the LMF, to obtain an uplink positioning measurement and measurement quality;
  reporting the uplink positioning measurement and the measurement quality to the LMF as a positioning report.

Optionally, if the positioning scheme is an uplink-and-downlink-based positioning scheme, the sending the positioning related information includes:
  receiving an uplink positioning reference signal sent by a terminal and measuring it in combination with a sending moment of a downlink positioning reference signal according to downlink positioning reference signal resource configuration information and uplink positioning reference signal resource configuration information received from the LMF, to obtain a positioning measurement and measurement quality of a combination of uplink and downlink at a base station side;
  sending the positioning measurement and the measurement quality of the combination of uplink and downlink at the base station side to the LMF as a positioning report.

Optionally, the downlink reference signal includes one or a combination of: an NR PRS, a CSI-RS, an SSB.

Optionally, the uplink reference signal includes a UL SRS.

Optionally, the positioning scheme includes one of following positioning schemes: various downlink-based positioning schemes, uplink-based positioning schemes, and uplink-and-downlink-based positioning schemes supported by 3GPP.

On the LMF side, another information communication device provided by an embodiment of the present application includes:
  a memory configured to store program instructions;
  a processor configured to invoke the program instructions stored in the memory, and execute according to an obtained program:
  determining positioning reference signal resource configuration information and a positioning scheme through a negotiation process between a LMF and other node; where the negotiation process is an interaction process of positioning related information;
  notifying the other node of the positioning reference signal resource configuration information and the positioning scheme.

Optionally, the other node includes a base stations and/or a terminal.

Optionally, the processor is further configured to:
receive a positioning report sent by the other node, where the positioning report is obtained by the other node through measuring a positioning reference signal based on the positioning reference signal resource configuration information.

Optionally, the processor is further configured to:
determine a terminal location based on the positioning report.

Optionally, the positioning report includes a positioning measurement and measurement quality obtained by measuring the positioning reference signal and reported by the other node.

Optionally, when determining positioning reference signal resource configuration information and a positioning scheme through a negotiation process between a LMF and other node, the processor is specifically configured to:
  determine first positioning reference signal resource configuration information and a first positioning scheme according to a first predefined criterion for a first negotiation process.

Optionally, when determining positioning reference signal resource configuration information and a positioning scheme through a negotiation process between a LMF and other node, the processor is configured to:
  judge whether current positioning reference signal resource configuration information and/or positioning scheme is reasonable according to a second predefined criterion for a non-first negotiation process, and determine to adopt the reasonable current positioning reference signal resource configuration information and/or positioning scheme;
  where the reasonable current positioning reference signal resource configuration information is the first positioning reference signal resource configuration information, or second positioning reference signal resource configuration information re-determined according to a third predefined criterion; and the reasonable current positioning scheme is the first positioning scheme, or a second positioning scheme re-determined according to the third predefined criterion.

Optionally, when notifying the other node of the positioning reference signal resource configuration information and the positioning scheme, the processor is specifically configured to: notify the other node of the reasonable current positioning reference signal resource configuration information and current positioning scheme determined according to the second predefined criterion.

Optionally, if it is determined that the current positioning reference signal resource configuration information is unreasonable according to the second predefined criterion, the second positioning reference signal resource configuration information and/or the second positioning scheme is/are further determined according to the third predefined criterion.

Optionally, the first predefined criterion includes:
  determining the first positioning reference signal resource configuration information according to lowest positioning performance of all terminals or a part of terminals covered by a base station associated with the LMF as well as a preconfigured mapping relationship between positioning reference signal resources and positioning performance.

Optionally, the second predefined criterion includes: determining that the second positioning reference signal resource configuration information and the second positioning scheme are reasonable in response to one or a combination of following conditions being satisfied; otherwise, determining that the second positioning reference signal resource configuration information and the second positioning scheme are unreasonable:
  condition 1: measurement quality is higher than a preset measurement quality threshold;
  condition 2: a measurement variance is less than a preset threshold of the measurement variance; or
  condition 3: a normalized relative position error between a calculation result of a terminal position obtained based on a 3GPP positioning scheme and a calculation result of a terminal position obtained based on an A-GNSS positioning scheme is less than a preset position error threshold.

Optionally, the third predefined criterion includes:
  determining the second positioning reference signal resource configuration information and/or the second positioning scheme according to actual positioning performance of a terminal in a base station associated with the LMF as well as a preconfigured mapping relationship between positioning reference signal resources and positioning performance of positioning schemes.

At the terminal side and the base station side, another information communication device provided by an embodiment of the present application includes:
  a memory configured to store program instructions;
  a processor configured to invoke the program instructions stored in the memory, and execute according to an obtained program:
  receiving positioning reference signal resource configuration information and a positioning scheme sent by a Location Management Function (LMF); where the positioning reference signal resource configuration information and the positioning scheme are determined through a negotiation process between the LMF and other node; where the negotiation process is an interactive process of positioning related information;
  sending the positioning related information based on the positioning reference signal resource configuration information and a type of the positioning scheme.

Optionally, the positioning scheme is one of following schemes:
  a downlink-based positioning scheme;
  an uplink-based positioning scheme; or an uplink-and-downlink-based positioning scheme.

Optionally, if the positioning scheme is a downlink-based positioning scheme, the sending the positioning related information includes:

receiving and measuring a downlink positioning reference signal sent by a base station according to downlink positioning reference signal resource configuration information received from the LMF, to obtain a downlink positioning measurement and measurement quality;

sending the downlink positioning measurement and the measurement quality to the LMF as a positioning report.

Optionally, if the positioning scheme is an uplink-based positioning scheme, the sending the positioning related information includes:

sending an uplink positioning reference signal to a base station according to uplink positioning reference signal resource configuration information received from the LMF or the base station.

Optionally, if the positioning scheme is an uplink-and-downlink-based positioning scheme, the sending the positioning related information includes:

receiving a downlink positioning reference signal sent by a base station and measuring it in combination with an uplink positioning reference signal according to downlink positioning reference signal resource configuration information and uplink positioning reference signal resource configuration information received from the LMF, and obtaining a positioning measurement of a combination of uplink and downlink on a terminal side and measurement quality;

sending the positioning measurement and the measurement quality of the combination of uplink and downlink at the terminal side to the LMF as a positioning report.

Optionally, if the positioning scheme is a downlink-based positioning scheme, the sending the positioning related information includes:

sending a downlink positioning reference signal to a terminal according to downlink positioning reference signal resource configuration information received from the LMF.

Optionally, if the positioning scheme is an uplink-based positioning scheme, then sending the positioning related information specifically includes:

receiving and measuring an uplink positioning reference signal sent by a terminal according to uplink positioning reference signal resource configuration information received from the LMF, and obtaining an uplink positioning measurement and measurement quality;

reporting the uplink positioning measurement and the measurement quality to the LMF as a positioning report.

Optionally, if the positioning scheme is an uplink-and-downlink-based positioning scheme, the sending the positioning related information includes:

receiving an uplink positioning reference signal sent by a terminal and measuring it in combination with a sending moment of a downlink positioning reference signal according to downlink positioning reference signal resource configuration information and uplink positioning reference signal resource configuration information received from the LMF, to obtain a positioning measurement and measurement quality of a combination of uplink and downlink at a base station side;

sending the positioning measurement and the measurement quality of the combination of uplink and downlink at the base station side to the LMF as a positioning report.

Optionally, the downlink reference signal includes one or a combination of: an NR PRS, a CSI-RS, an SSB.

Optionally, the uplink reference signal includes a UL SRS.

Optionally, the positioning scheme includes one of following positioning schemes: various downlink-based positioning schemes, uplink-based positioning schemes, and uplink-and-downlink-based positioning schemes supported by 3GPP.

Another embodiment of the present application provides a computer storage medium storing the computer executable instructions which are configured to cause the computer to perform any one of the above-mentioned methods.

BRIEF DESCRIPTION OF THE DRAWINGS

In order to illustrate the technical solutions in the embodiments of the present application more clearly, the accompanying figures which need to be used in describing the embodiments will be introduced below briefly. Obviously the accompanying figures described below are only some embodiments of the present application, and other accompanying figures can also be obtained by those ordinary skilled in the art according to these accompanying figures without creative labor.

DETAILED DESCRIPTION

Figure 1:
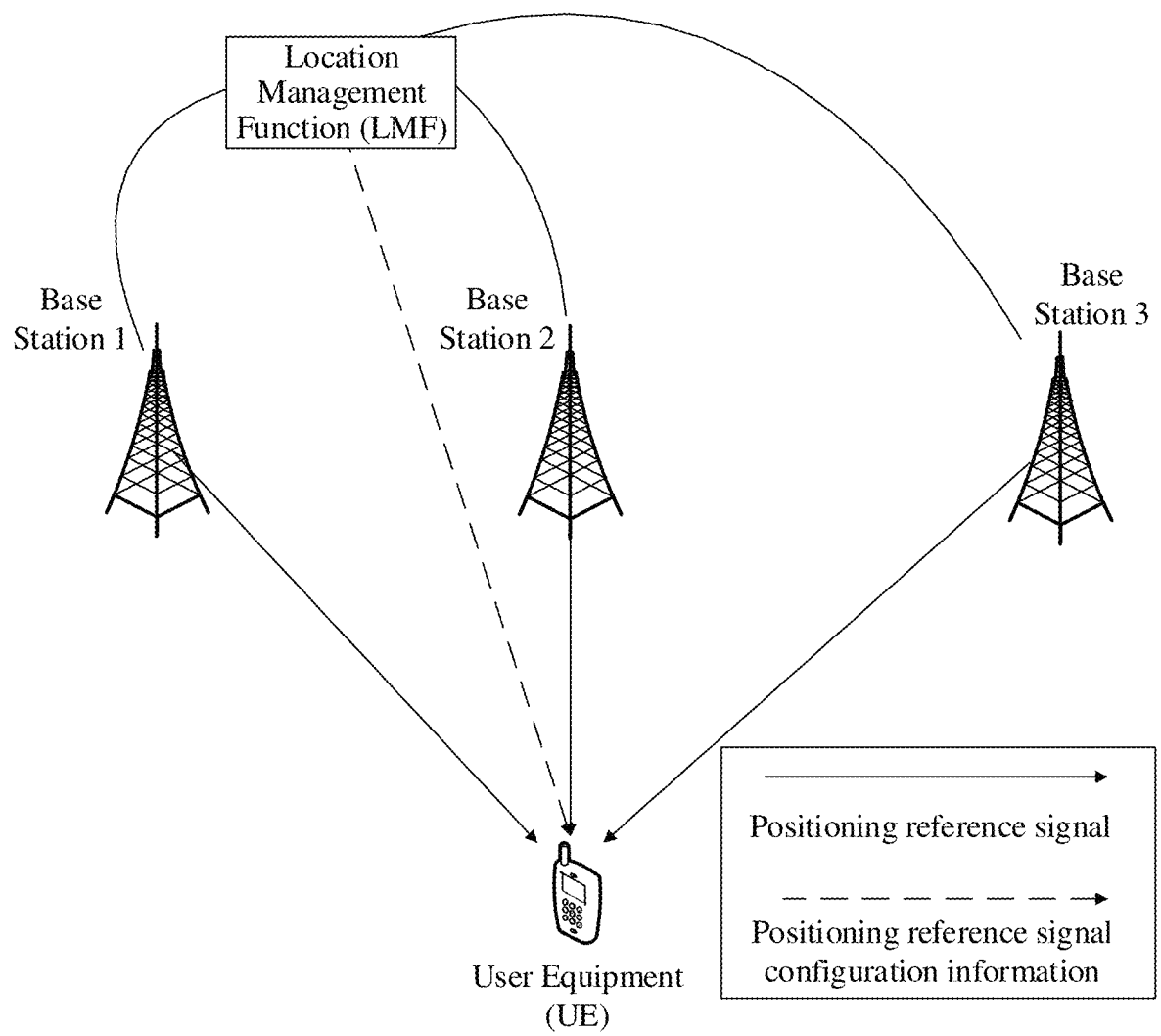
FIG. 1 is an architecture schematic diagram of a UE positioning system in the prior art.

The technical solutions in the embodiments of the present application will be described clearly and completely below in combination with the accompanying drawings in the embodiments of the present application. Obviously the described embodiments are only a part of the embodiments of the present application but not all the embodiments.

Based upon the embodiments of the present application, all of other embodiments obtained by those ordinary skilled in the art without creative work pertain to the protection scope of the present application.

Embodiments of the present application provide an information communication method and apparatus, so as to determine the positioning reference signal resource configuration information and the positioning scheme through a negotiation process between a Location Management Function (LMF) and other node, thereby avoiding the problem that adjacent base stations may send the positioning reference signals on the same time and frequency resources so that the positioning reference signals of the adjacent base station interfere with each other to cause the degradation of the performance of the downlink positioning measurements. This method and apparatus can also support the base stations to configure the positioning reference signal optimally according to the positioning performance requirements of the terminal, thereby improving the positioning performance.

Here, the method and apparatus are based on the same application concept. Since the principle of solving the problem in the method is similar to that in the apparatus, the implementations of the apparatus and method can refer to each other, and the repeated description thereof will be omitted.

The technical solutions provided by the embodiments of the present application may be applicable to various systems, especially the 5th generation (5G) system. For example, the applicable systems may be: Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS), Worldwide interoperability for Microwave Access (WiMAX) system, 5G system and 5G NR system, etc. These systems all include terminal devices and network devices.

The terminal device involved in the embodiments of the present application may be a device for providing the voice and/or data connection function to the user, a handheld device with the wireless connection function, or other processing device connected with the wireless modem. In different systems, the terminal device may have different names. For example, in a 5G system, the terminal device may be referred to as User Equipment (UE). The wireless terminal device can communicate with one or more core networks via the Radio Access Network (RAN), and the wireless terminal device can be a mobile terminal, such as a mobile telephone (or called "cellular" telephone), and a computer with the mobile terminal, for example, can be a portable, pocket, handheld, computer built-in or vehicle-carried mobile device, and they exchange the voice and/or data with the radio access network, such as, Personal Communication Service (PCS) telephone, cordless telephone, Session Initiation Protocol (SIP) telephone, Wireless Local Loop (WLL) station, Personal Digital Assistant (PDA) and other devices. The wireless terminal device can also be referred to as system, subscriber unit, subscriber station, mobile station, mobile, remote station, access point, remote terminal, access terminal, user terminal, user agent, user device, which is not limited in the embodiments of the present application.

The network device involved in the embodiments of present application may be a base station, which may include a plurality of cells. Depending on specific application scenarios, the base station may also be called access point, or may refer to the device in the access network communicating with the wireless terminal via one or more sectors over the air interface or other names. The network device may be used to perform the inter-conversion between the received air frame and Internet Protocol (IP) packet, and used as the router between the wireless terminal device and the rest of the access network, where the rest of the access network may include IP networks. The network device may further coordinate the attribute management of the air interface. For example, the network device involved in the embodiments of the present application can be a network device (Base Transceiver Station (BTS)) in the Global System of Mobile communication (GSM) or Code Division Multiple Access (CDMA), or can be a network device (NodeB) in the Wideband Code Division Multiple Access (WCDMA), or can be an evolutional network device (evolutional Node B (eNB or e-NodeB)) in the Long Term Evolution (LTE) system, a 5G base station in the 5G network architecture (next generation system), or can be a Home evolved Node B (HeNB), a relay node, femto, pico, etc., which is not limited in the embodiments of the present application.

The embodiments of the present application will be described below in detail with reference to the drawings of the specification. It should be noted that the showing order of the embodiments of the present application only represents the sequential order of the embodiments, but does not represent the pros and cons of the technical solutions provided by the embodiments.

A method for configuring a positioning reference signal coordinated by a Location Management Function (LMF) according to an embodiment of the present application is introduced as follows.

The technical solution of the embodiment of the present application includes the following.

Firstly, the LMF configures the first positioning reference signal resource configuration information (i.e., the initial resource configuration) and the first positioning scheme according to a first predefined criterion and notifies a UE and a base station of them, and the LMF receives a first positioning report from the UE and the base station and determines a first UE position result; and then, the LMF assigns the first positioning reference signal resource configuration information as the second positioning reference signal resource configuration information, and assigns the first positioning scheme as the second positioning scheme. The following several rounds of positioning negotiation process are performed among the LMF, base station and UE: (1) the LMF judges whether the current second positioning reference signal resource and/or second positioning scheme is reasonable according to a second predefined criterion based on one or a combination of a second positioning report from the UE and the base station and a second UE position result; in response to being unreasonable, the updated second positioning reference signal resource configuration information and/or the updated second positioning scheme is/are further determined based on a third predefined criterion; in response to being reasonable, the current second positioning reference signal resource configuration information and second positioning scheme continue to be used; (2) the LMF notifies the UE and the base station of the second positioning reference signal resource configuration information and the second positioning scheme by broadcast, multicast or unicast; (3) the LMF receives the second positioning report from the UE and the base station based on the second positioning reference signal resource configuration information, and determines the second UE position result.

Optionally, the first predefined criterion includes but is not limited to: the LMF determines the first positioning reference signal resource configuration information and the first positioning scheme according to the lowest positioning performance of all UEs or some UEs (for example, more than X % UEs, e.g., X=80) covered by the associated base station as well as a preconfigured mapping relationship between the positioning reference signal resource configuration information and the positioning performance (for example, the mapping relationship is obtained by simulation or fixed configuration).

Optionally, the second predefined criterion includes: determining that the second positioning reference signal resource configuration information and/or the second positioning scheme is/are reasonable when one or a combination of three following conditions is/are satisfied; otherwise, determining that the second positioning reference signal resource configuration information and/or the second positioning scheme is/are unreasonable:
   the measurement quality is higher than a preset measurement quality threshold;
   the measurement variance is less than a preset threshold of the measurement variance;
   the normalized relative position error between a calculation result of a UE position obtained based on a $3^{rd}$ Generation Partnership Project (3GPP) positioning scheme and a calculation result of a UE position obtained based on an Assisting-Global Navigation Satellite System (A-GNSS) positioning scheme is less than a preset position error threshold.

Optionally, the third predefined criterion includes but is not limited to: the LMF determines the second positioning reference signal resource configuration information and/or the second positioning scheme according to the actual positioning performance of the UE covered by the associated base station as well as a preconfigured mapping relationship between positioning reference signal resources and positioning performance (for example, the mapping relationship is obtained by simulation or fixed configuration).

Optionally, any one of the above-mentioned positioning reference signals (applicable to the first positioning reference signal and the second positioning reference signal) includes:
   a Down Link Positioning Reference Signal (DL PRS) for downlink positioning and combined uplink and downlink positioning, for example, including but not limited to: a New Radio Positioning Reference Signal (NR PRS), a Channel State Information-Reference Signal (CSI-RS), a Synchronization Signal/Physical Broadcast Channel Block (SSB), etc.;
   and/or, an uplink reference signal for uplink positioning and combined uplink and downlink positioning, such as a Sounding Reference Signal (SRS).

Optionally, any one of the above-mentioned positioning schemes (applicable to the first positioning scheme and the second positioning scheme) includes: one or more of various downlink-based positioning methods (for example: Observed Time Difference Of Arrival (OTDOA), Down Link-Angle Of Departure (DL-AoD), Down Link-Angle Of Arrival (DL-AoA)), uplink-based positioning methods (for example: Up Link Time Difference Of Arrival (UL-TDOA), Up Link-Angle Of Arrival (UL-AoA)), and uplink-and-downlink-based positioning methods (for example: Enhanced Cell Identification (E-CID), Multiple Cell-Round Time Trip (Multiple-RTT), etc.) supported by the 3GPP.

The technical solutions provided by the embodiments of the present application at the LMF, UE, and base station sides respectively will be introduced below.

LMF Side

The positioning negotiation process regarding the information among the LMF, UE and base station, for example, includes the following steps.

Step 1.0: pre-configure an initial value of N, an initial value of N_MAX, a threshold value of the measurement quality, a threshold value of a measurement variance, and a threshold value of an error coefficient; where the initial value of N is 1, and N_MAX is a positive integer greater than 1 and indicates the maximum number of times of positioning negotiation.

Step 1.1: compare N with N_MAX in the $N^{th}$ round of positioning negotiation.

If N>=N_MAX, the positioning negotiation process ends.

Otherwise, it is judged whether N is equal to 1.

If N=1, the LMF determines the first positioning reference signal resource configuration information and the first positioning scheme according to a first predefined criterion, and then proceeds to Step 1.3.

In the case of N>1, if N=2, the LMF assigns the first positioning reference signal resource configuration information as the second positioning reference signal resource configuration information, and assigns the first positioning scheme as the second positioning scheme; otherwise (that is, N>2), the LMF maintains the current second positioning reference signal resource configuration information and second positioning scheme.

The LMF judges whether the current second positioning reference signal resource configuration information is reasonable according to a second predefined criterion:
   in response to being reasonable, the current $N^{th}$ round of positioning negotiation process ends, and proceed to step 1.3 based on the current second positioning reference signal resource configuration information and second positioning scheme;
   in response to being unreasonable, proceed to step 1.2 and continue with the $N^{th}$ round of positioning negotiation.

Step 1.2: the LMF reconfigures the second positioning reference signal resource configuration information and/or second positioning scheme for respective base stations according to a third predefined criterion, and proceeds to Step 1.3.

Here, the step of reconfiguring the second positioning reference signal resource configuration information according to the third predefined criterion, for example, includes: (1) using a new second positioning reference signal resource configuration; or (2) using a Muting mechanism to avoid the interference of the downlink positioning reference signals of respective base stations based on the second positioning reference signal resource configuration in the previous round.

Step 1.3: the LMF notifies each UE and base station of the configured first positioning reference signal resource configuration information or second positioning reference signal resource configuration information and the current positioning scheme (for example, the type information of the current positioning scheme may be notified) through broadcast, multicast or unicast, and proceeds to Step 1.4.

Here, the current positioning scheme is the first positioning scheme or the second positioning scheme.

Step 1.4: the LMF receives a first positioning report or a second positioning report currently reported by the UE and/or the base station, and then proceeds to Step 1.5.

Here, the first positioning report is obtained by the UE and each base station through measuring the first positioning reference signal according to the first positioning reference signal resource configuration information configured by the LMF.

The second positioning report is obtained by the UE and each base station through measuring the second positioning reference signal according to the second positioning reference signal resource configuration information configured by the LMF.

Step 1.5: the LMF determines the location of the UE based on the first positioning report or the second positioning report currently reported by the UE and/or the base station and the current positioning scheme, and proceeds to Step 1.6.

Step 1.6: update N=N+1, and proceed to step 1.1.

Optionally, any one of the positioning reports (applicable to the first positioning report and the second positioning report) includes: a measurement and the measurement quality reported by the UE and/or the base station, including two types:
1) the measurement and measurement quality on the UE side;
2) the measurement and measurement quality at the base station side.

Optionally, the method for determining the measurement and measurement quality reported by the UE is as follows: the UE receives and measures a Down Link Positioning Reference Signal (DL PRS) based on the DL PRS resource configuration information configured and sent by the LMF, to obtain the measurement and measurement quality on the UE side.

Optionally, the method for determining the measurement and measurement quality reported by the base station is as follows: the base station receives and measures a UL SRS signal sent by a terminal based on the UL SRS resource configuration information provided by the LMF, to obtain the measurement and/or measurement quality at the base station side.

Optionally, the first predefined criterion includes but is not limited to: the LMF determines the first positioning reference signal resource configuration information and the first positioning scheme according to the lowest positioning performance of all UEs or more than X % UEs (e.g., X=80) covered by the associated base station as well as a preconfigured mapping relationship between the positioning reference signal resource configuration information and the positioning performance (for example, that is obtained by simulation or fixed configuration).

Optionally, the second predefined criterion includes: determining that the second positioning reference signal resource configuration information and/or the second positioning scheme is/are reasonable in response to one or a combination of following conditions being satisfied; otherwise, determining that the second positioning reference signal resource configuration information and/or the second positioning scheme is/are unreasonable:
the measurement quality is higher than a preset measurement quality threshold;
the measurement variance is less than a preset threshold of the measurement variance;
the normalized relative position error between a calculation result of a UE position obtained based on the 3GPP positioning scheme and a calculation result of a UE position obtained based on the A-GNSS positioning scheme is less than a preset position error threshold.

Optionally, the third predefined criterion includes but is not limited to: the LMF determines the second positioning reference signal resource configuration information and/or the second positioning scheme according to the actual positioning performance of the UE covered by the associated base station as well as a preconfigured mapping relationship between positioning reference signal resources and positioning performance (for example, the mapping relationship is obtained by simulation or fixed configuration).

Correspondingly, the information communication process on the UE side for example includes the following.

Step 1: the UE receives the positioning reference signal resource configuration information and the type information of the current positioning scheme configured and notified by the LMF, where the notification mode may be broadcast, multicast or unicast.

Step 2: the UE judges the type of the current positioning scheme:
in response to a downlink-based positioning scheme, proceed to step 3;
in response to an uplink-based positioning scheme, proceed to step 4;
in response to an uplink-and-downlink-based positioning scheme, proceed to step 5.

Step 3: the UE's operations of the downlink-based positioning scheme include:
step 3.1: the UE receives and measures a positioning reference signal (such as DL PRS) sent by the base station according to the positioning reference signal resource configuration information (such as DL PRS resource configuration information) received from the LMF, and obtains the downlink positioning measurements (including TOA, DL-TDOA, DL-AoD, DL-AoA, etc.) and the measurement quality;
step 3.2: the UE reports the downlink positioning measurements and the measurement quality to the LMF as the positioning report.

Step 4: the UE's operations of the uplink-based positioning scheme include:
step 4.1: the UE sends an uplink positioning reference signal (such as UL SRS) to the base station according to the uplink positioning reference signal resource configuration information (such as UL Sounding Reference Signal (SRS) resource configuration information) received from the LMF or the base station.

Step 5: the UE's operations of the uplink-and-downlink-based positioning scheme include:
step 5.1: the UE receives a DL PRS sent by the base station according to the Downlink Positioning Reference Signal (DL PRS) and uplink positioning reference signal resource configuration information (such as UL SRS resource configuration information) received from the LMF, and performs a measurement in combination with the moment at which the UE sends a UL SRS, and obtains a positioning measurement (UE Rx-Tx difference) of the combination of uplink and downlink at the UE side and the measurement quality;
step 5.2: the UE reports the positioning measurement of the combination of uplink and downlink and the measurement quality to the LMF as the positioning report.

Correspondingly, the information communication process at the base station side for example includes the following.

Step 1: the base station receives the positioning reference signal resource configuration information and the type information of the current positioning scheme configured and notified by the LMF, where the LMF may notify the base station by broadcast, multicast or unicast.

Step 2: the base station judges the type of the current positioning scheme:
  in response to a downlink-based positioning scheme, proceed to step 3;
  in response to an uplink-based positioning scheme, proceed to step 4;
  in response to an uplink-and-downlink-based positioning scheme, proceed to step 5.

Step 3: the base station's operations of the downlink-based positioning scheme include:
  step 3.1: the base station sends a DL PRS to the UE according to the DL PRS resource configuration information received from the LMF.

Step 4: the base station's operations of the uplink-based positioning scheme include:
  step 4.1: the base station receives and measures an uplink positioning reference signal sent by the UE according to the uplink positioning reference signal resource configuration information (such as UL SRS resource configuration information) received from the LMF, and obtains the uplink positioning measurements (including TOA, UL-TDOA, UL-AoA, etc.) and the measurement quality;
  step 4.2: the base station reports the uplink positioning measurements and the measurement quality to the LMF as the positioning report.

Step 5: the base station's operations of the uplink-and-downlink-based positioning scheme include:
  step 5.1: the base station receives an uplink positioning reference signal (such as UL SRS) sent by the UE according to the DL PRS and uplink positioning reference signal resource configuration information (such as UL SRS resource configuration information) received from the LMF, and performs a measurement in combination with the moment at which the base station sends a DL PRS, and obtains a positioning measurement (gNB Rx-Tx difference) and the measurement quality of the combination of uplink and downlink at the base station side;
  step 5.2: the base station reports the positioning measurement of the combination of uplink and downlink and the measurement quality to the LMF as the positioning report.

Several specific embodiments are given below for illustration.

Embodiment I: DL-TDOA→DL-TDOA, Changing the DL PRS Resource Configuration Information In Embodiment I, the first positioning reference signal and the second positioning reference signal are both reference signals (DL PRSs) for downlink positioning; and the first positioning scheme and the second positioning scheme are both DL-TDOA (i.e., OTDOA). The second positioning reference signal resource is different from the first positioning reference signal resource that it has a larger PRS bandwidth and the Muting mechanism is used for it, to avoid the interference of the downlink positioning reference signal of respective base stations.

Figure 2:
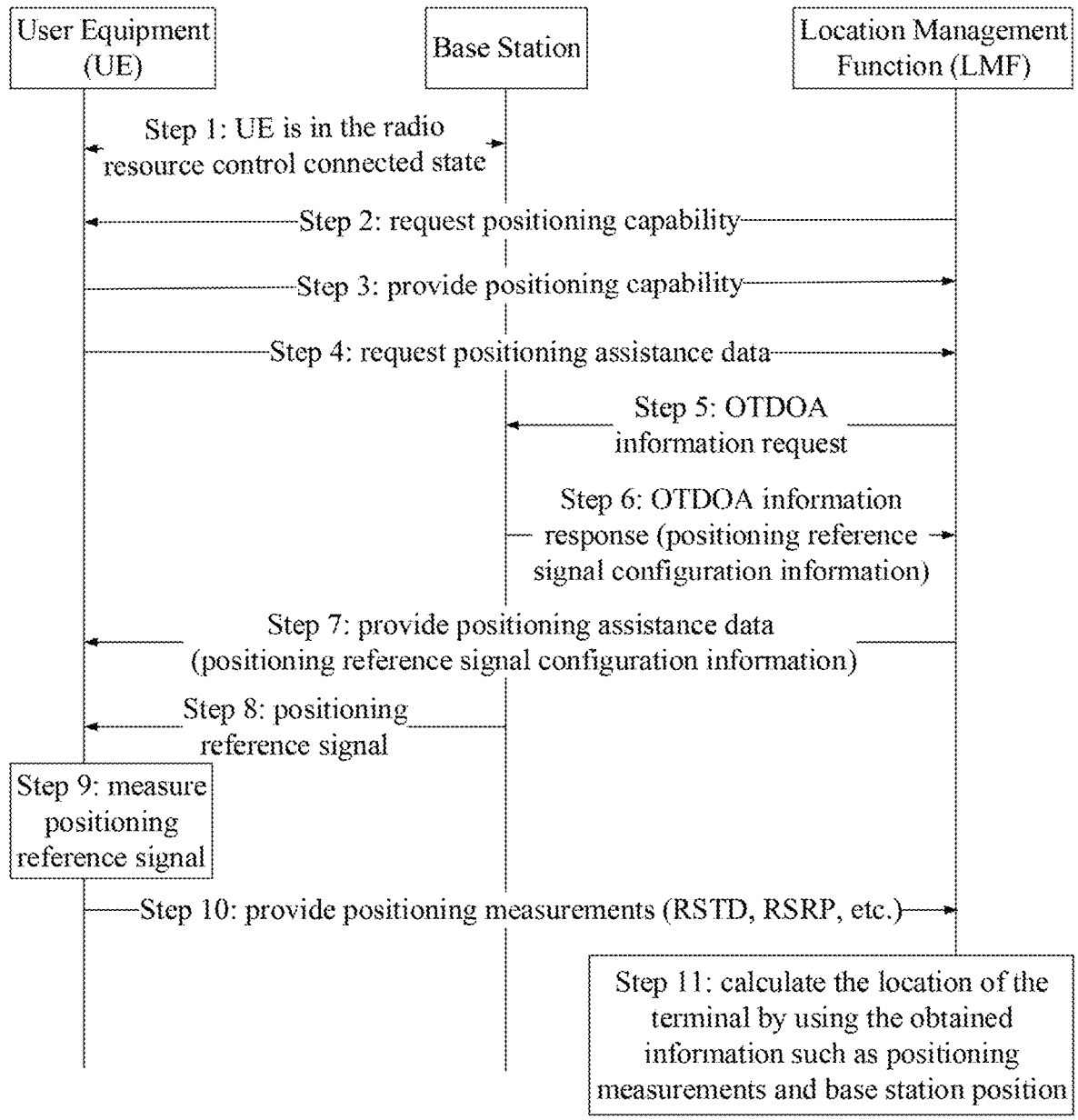
FIG. 2 is a schematic diagram of a UE positioning process in the prior art.
Figure 3:
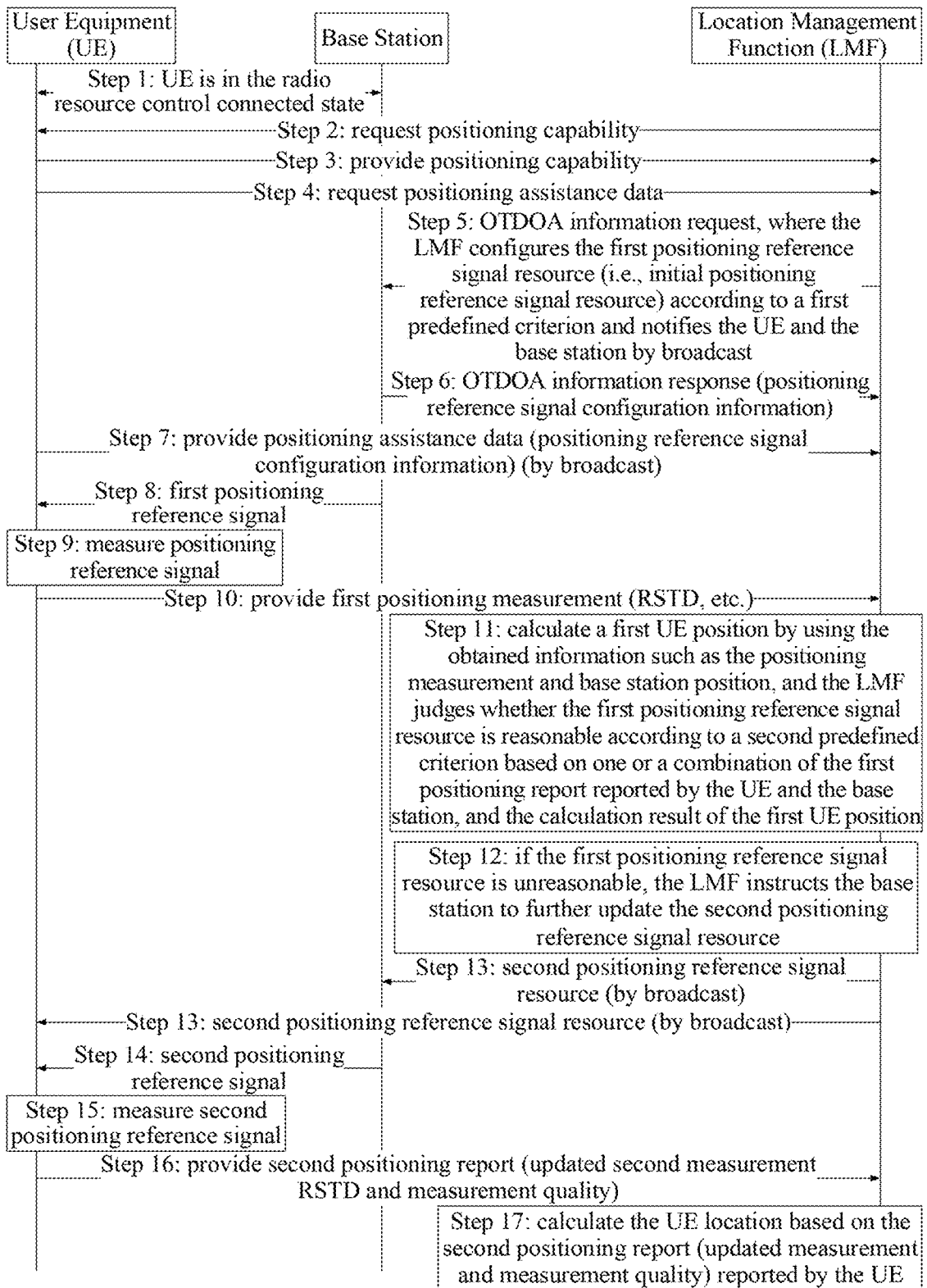
FIG. 3 is a schematic diagram of a UE positioning process according to Embodiment I of the present application.

FIG. 3 shows a UE positioning process of Embodiment I, which includes:
  steps 1 to 4: which are the same as steps 1 to 4 shown in FIG. 2, and will not be repeated here;
  step 5: in the OTDOA information request, the LMF determines the first PRS resource configuration information (i.e., the initial PRS resource) according to a first predefined criterion, and notifies the UE and the base station by broadcast;
  steps 6 to 10: which are the same as steps 6 to 10 shown in FIG. 2, and will not be repeated here;
  step 11: the LMF calculates a first UE position by using the obtained information such as the positioning measurement and base station position; and the LMF judges whether the first PRS resource configuration information is reasonable according to a second predefined criterion based on one or a combination of the first positioning report reported by the UE and the base station, and the calculation result of the first UE position.
  step 12: if the first PRS resource configuration information is unreasonable, the LMF instructs the base station to further determine the second PRS resource configuration information (for example: using a larger PRS bandwidth, and using the Muting mechanism to avoid the interference of the downlink positioning reference signal of each base station), and still uses the OTDOA positioning scheme.
  step 13: the LMF notifies the UE and the base station of the second PRS resource configuration information through broadcast, multicast or unicast.
  step 14: the UE receives a DL PRS signal (i.e., the second PRS reference signal) sent by the base station according to the latest second PRS resource configuration information.
  step 15: the UE measures the second PRS reference signal according to the second PRS resource configuration information, and obtains a second positioning measurement (for example, RSTD).
  step 16: the UE reports the second positioning report (including the updated second measurement RSTD obtained in step 15 and the measurement quality) to the LMF.
  step 17: the LMF calculates the UE position based on the second positioning report (updated measurement and measurement quality) reported by the UE.

The technical solution provided by the Embodiment I will be illustrated below by examples at the LMF, UE, and base station sides, respectively.

LMF Side

The positioning negotiation process of mutual information among the LMF, UE and base station, for example, includes the following.

Step 1.0: configure the initial value of N to be 1, the initial value of N_MAX to be 8, a threshold value of the measurement quality, a threshold value of a measurement variance, and a threshold value of an error coefficient; where N_MAX represents the maximum number of times of positioning negotiation.

Step 1.1: compare N with N_MAX in the $N^{th}$ round of positioning negotiation.

If N>=N_MAX, the positioning negotiation process ends.

Otherwise, it is judged whether N is equal to 1.

In response to N=1, the LMF determines the first DL PRS resource configuration information and the OTDOA positioning scheme according to a first predefined criterion, and proceeds to Step 1.3.

In response to N>1, the LMF judges whether the current second DL PRS resource configuration information (if N=2, the current second DL PRS resource configuration information is the first DL PRS resource configuration information; otherwise, the current second DL PRS resource configuration information is the DL PRS resource configuration information determined by using a third predefined criterion, and the same applies to other embodiments) is reasonable according to a second predefined criterion.

In response to being reasonable, the current N$^{th}$ round of positioning negotiation process ends, and proceed to step 1.3 based on the current DL PRS resource and OTDOA positioning scheme.

In response to being unreasonable, proceed to step 1.2 and continue with the N$^{th}$ round of positioning negotiation.

Step 1.2: the LMF determines the second DL PRS resources to be reconfigured for each base station (including: using a new second positioning reference signal resource configuration) according to the third predefined criterion, and proceeds to Step 1.3.

Step 1.3: the LMF notifies each UE and base station of the currently configured DL PRS resource configuration information (the first DL PRS resource configuration information or the second DL PRS resource configuration information) by broadcast, and proceeds to Step 1.4.

Step 1.4: the LMF receives a first positioning report or a second positioning report currently reported by the UE, and proceeds to Step 1.5.

Here, the first positioning report is obtained by the UE and each base station through measuring the first DL PRS according to the first DL PRS resource information configured by the LMF.

The second positioning report is obtained by the UE and each base station through measuring the second DL PRS according to the second DL PRS resource information configured by the LMF.

Step 1.5: the LMF determines the location of the UE based on the first positioning report or the second positioning report currently reported by the UE and the OTDOA positioning scheme, and proceeds to Step 1.6.

Step 1.6: update N=N+1, and proceed to step 1.1.

Here, optionally, the positioning report in step 1.4 and step 1.5 include: the measurement and the measurement quality reported by the UE, which are only the RSTD measurement and the measurement quality (uncertainty mean estimated value and resolution) on the UE side.

Here, optionally, the method for determining the measurement and the measurement quality reported by the UE is as follows: the UE receives and measures a DL PRS based on the DL PRS resource configuration information configured and sent by the LMF, and obtains the measurement and the measurement quality at the UE side.

Here, optionally, the first predefined criterion in step 1.1 includes but is not limited to: the LMF determines the first DL PRS resource configuration information according to the lowest positioning performance of all UEs or more than X % UEs (e.g., X=80) covered by the associated base station as well as a pre-configured mapping relationship between DL PRS resources and positioning performance (for example, obtained by simulation).

Here, optionally, the second predefined criterion in step 1.1 includes: determining that the second positioning reference signal resource configuration information and/or the second positioning scheme is/are reasonable in response to one or a combination of following conditions being satisfied; otherwise, determining that the second positioning reference signal resource configuration information and/or the second positioning scheme is/are unreasonable:
   the measurement quality is higher than a preset measurement quality threshold;
   the measurement variance is less than a preset threshold of the measurement variance;
   the normalized relative position error between a calculation result of a UE position obtained based on the 3GPP positioning scheme and a calculation result of a UE position obtained based on the A-GNSS positioning scheme is less than a preset error coefficient threshold.

Here, optionally, the third predefined criterion in step 1.2 includes but is not limited to: the LMF determines the second DL PRS resource configuration information and/or the second positioning scheme according to the actual positioning performance of the UE covered by the associated base station as well as a preconfigured mapping relationship between DL PRS resources and positioning performance (for example, obtained by simulation).

Correspondingly, the information communication process at the UE side for example includes the following.

Step 1: the UE receives the DL PRS resource configuration information configured and notified by the LMF, where the notification mode is broadcast.

Step 2: the UE determines that the type of the current positioning scheme is a downlink-based positioning scheme, and then proceeds to Step 3.

Step 3: the UE's operations of the downlink-based positioning scheme:
   3.1: the UE receives and measures a DL PRS sent by the base station according to the DL PRS resource configuration information received from the LMF, and obtains the downlink positioning measurement (including DL-TDOA) and the measurement quality (uncertainty mean estimated value and resolution);
   3.2: the UE reports the downlink positioning measurement and the measurement quality to the LMF as the positioning report.

Correspondingly, the information communication process at the base station side for example includes the following.

Step 1: the base station receives the DL PRS resource configuration information configured and notified by the LMF, where the notification mode may be broadcast, multicast or unicast.

Step 2: the base station determines that the type of the current positioning scheme is a downlink-based positioning scheme, and then proceeds to Step 3.

Step 3: the base station's operations of the downlink-based positioning scheme:
   3.1: the base station sends a DL PRS to the UE according to the DL PRS resource configuration information received from the LMF.

Embodiment II: DL-TDOA→UL-TDOA, Changing the UL SRS Resource Configuration Information In this Embodiment II, the first positioning reference signal is a reference signal DL SSB for downlink positioning, and the second positioning reference signal is a reference signal UL SRS for uplink positioning; the first positioning scheme is DL-TDOA (i.e., OTDOA), and the second positioning scheme is UL-TDOA.

Figure 4:
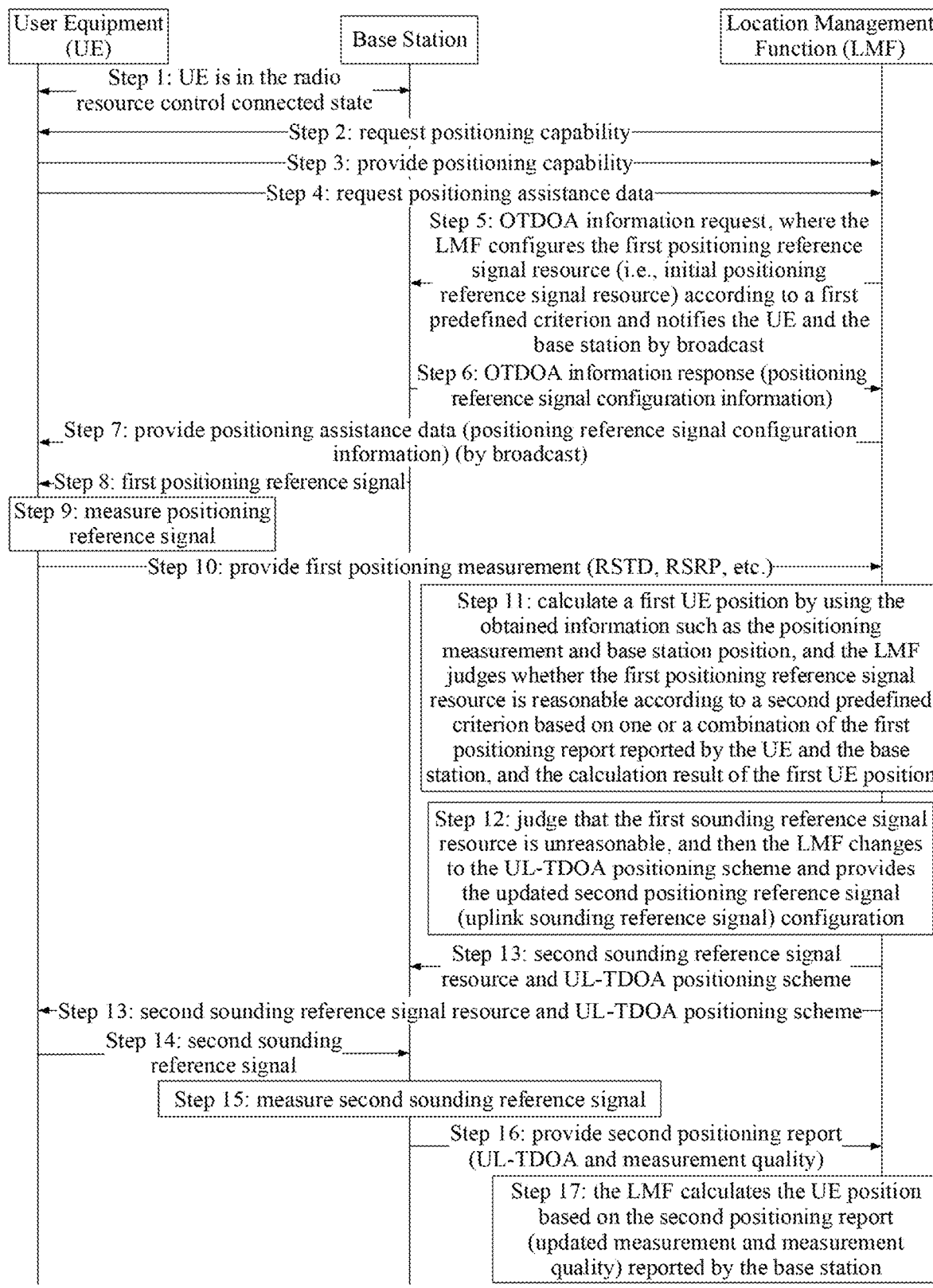
FIG. 4 is a schematic diagram of a UE positioning process according to Embodiment II of the present application.

FIG. 4 shows a UE positioning process of Embodiment II, which includes the following.

Steps 1 to 4: which are the same as steps 1 to 4 shown in FIG. 2, and will not be repeated here.

Step 5: in the OTDOA information request, the LMF configures the first SSB resource (i.e., the initial SSB resource) according to a first predefined criterion, and notifies the UE and the base station by broadcast.

Steps 6 to 10: which are the same as steps 6 to 10 shown in FIG. 2, and will not be repeated here.

Step 11: the LMF calculates a first UE position by using the obtained information such as the positioning measurement and base station position; and the LMF judges whether the first SSB resource is reasonable according to a second predefined criterion based on one or a combination of the first positioning report reported by the UE and the base station, and the calculation result of the first UE position.

Step 12: judge that the first SSB resource is unreasonable, and then the LMF instructs the base station to change to the UL-TDOA positioning scheme and provides the updated second positioning reference signal (UL SRS) resource configuration information.

Step 13: the LMF notifies the UE and the base station of the updated second SRS resource configuration information and the UL-TDOA positioning scheme through broadcast, multicast or unicast.

Step 14: the UE sends a UL SRS signal (i.e., a second SRS reference signal) to the base station according to the updated second SRS resource configuration information.

Step 15: the base station measures the second SRS reference signal according to the second SRS resource configuration information, and obtains a second positioning measurement (UL TDOA, etc.).

Step 16: the base station reports the second positioning report (updated RSTD, RSRP and measurement quality) to the LMF.

Step 17: the LMF calculates the UE position based on the second positioning report (updated measurement and measurement quality) reported by the base station and the UL-TDOA.

The technical solution provided by the Embodiment II will be introduced below from the LMF, UE, and base station sides, respectively.

The information communication method on the LMF side is illustrated below.

The positioning negotiation process of mutual information among the LMF, UE and base station specifically includes the following.

Step 1.0: configure the initial value of N to be 1, the initial value of N_MAX to be 10, a threshold value of the measurement quality, a threshold value of a measurement variance, and a threshold value of an error coefficient.

Step 1.1: compare N with N_MAX in the $N^{th}$ round of positioning negotiation.

If N>=N_MAX, the positioning negotiation process ends.

Otherwise, it is judged whether N is equal to 1.

If N=1, the LMF determines the first DL SSB resource configuration information and the OTDOA positioning scheme according to a first predefined criterion, and proceeds to Step 1.3.

If N>1, the LMF judges whether the current second positioning reference signal resource configuration information is reasonable according to a second predefined criterion.

In response to being reasonable, the current $N^{th}$ round of positioning negotiation process ends, and proceed to step 1.3 based on the current positioning reference signal resource configuration information and positioning scheme.

In response to being unreasonable, proceed to step 1.2 and continue with the $N^{th}$ round of positioning negotiation.

Step 1.2: the LMF determines, according to a third predefined criterion, the second positioning reference signal resource configuration information to be reconfigured for each base station (including: (1) using a new second positioning reference signal resource configuration; (2) using a Muting mechanism to avoid the interference of the downlink positioning reference signal of each base station based on the second positioning reference signal resource configuration in the previous round) and the second positioning scheme UL-TDOA, and proceeds to Step 1.3.

Step 1.3: the LMF notifies each UE and base station of the configured first DL SSB or second UL SRS resource configuration information by broadcast, multicast or unicast, and proceeds to Step 1.4.

Step 1.4: the LMF receives a first positioning report or a second positioning report currently reported by the UE or base station, and proceeds to Step 1.5.

Here, the first positioning report is obtained by the UE/base station through measuring the first positioning reference signal according to the first DL SSB resource configuration information configured by the LMF.

The second positioning report is obtained by the UE/base station through measuring the second positioning reference signal according to the second UL SRS resource configuration information configured by the LMF.

Step 1.5: the LMF determines the location of the UE based on the first positioning report/second positioning report currently reported by the UE/base station and the OTDOA positioning scheme/UL-TDOA positioning scheme, and proceeds to Step 1.6.

Step 1.6: update N=N+1, and proceed to step 1.1.

Optionally, the positioning report in step 1.4 and step 1.5 include: the measurements and the measurement quality reported by the UE and/or the base station, including two types: 1) the measurement and measurement quality from the UE side, and 2) the measurement and measurement quality from the base station side.

Optionally, the method for determining the measurement and measurement quality reported by the UE is as follows: the UE receives and measures a DL SSB based on the DL SSB resource configuration information configured and sent by the LMF, and obtains the first type of measurement and measurement quality, i.e., the measurement and measurement quality at the UE side.

Optionally, the method for determining the measurement and measurement quality reported by the base station is as follows: the base station receives and measures a UL SRS signal sent by the terminal based on the UL SRS resource configuration provided by the LMF, and obtains the second type of measurement and/or measurement quality, i.e., the measurement and measurement quality at the base station side.

Optionally, the first predefined criterion in step 1.1 includes but is not limited to: the LMF determines the first positioning reference signal resource configuration information according to the lowest positioning performance of all UEs or more than X % UEs (e.g., X=80) covered by the associated base station as well as a pre-configured mapping relationship between positioning reference signal resources and positioning performance (for example, obtained by simulation or fixed configuration).

Optionally, the second predefined criterion in step 1.1 includes: in response to one or a combination of following conditions being satisfied, determining that the second positioning reference signal resource configuration information and/or the second positioning scheme is/are reasonable; otherwise, determining that the second positioning reference signal resource configuration information and/or the second positioning scheme is/are unreasonable:

the measurement quality is higher than a preset measurement quality threshold;

the measurement variance is less than a preset threshold of the measurement variance;

the normalized relative position error between a calculation result of a UE position obtained based on the 3GPP positioning scheme and a calculation result of a UE position obtained based on the A-GNSS positioning scheme is less than a preset error coefficient threshold.

Optionally, the third predefined criterion in step 1.2 includes but is not limited to: the LMF determines the second positioning reference signal resource configuration information and/or the second positioning scheme according to the actual positioning performance of the UE covered by the associated base station as well as a preconfigured mapping relationship between positioning reference signal resources and positioning performance (for example, obtained by simulation or fixed configuration).

Correspondingly, the information communication process on the UE side for example includes the following.

Step 1: the UE receives the positioning reference signal resource configuration information configured and notified by the LMF, where the notification mode may be broadcast, multicast or unicast.

Step 2: the UE judges the type of the current positioning scheme; in response to a downlink-based positioning scheme, proceed to step 3; in response to an uplink-based positioning scheme, proceed to step 4.

Step 3: the UE's operations of the downlink-based positioning scheme:

3.1: the UE receives and measures a DL SSB sent by the base station according to the DL SSB resource configuration information received from the LMF and obtains the downlink positioning measurements (including TOA, DL-TDOA, DL-AoD, DL-AoA, etc.) and the measurement quality;

3.2: the UE reports the downlink positioning measurement and the measurement quality to the LMF as the positioning report.

Step 4: the UE's operations of the uplink-based positioning scheme:

4.1: the UE sends a UL SRS to the base station according to the UL SRS resource configuration information received from the LMF or the base station.

Correspondingly, the information communication process at the base station side for example includes the following.

Step 1: the base station receives the positioning reference signal resource configuration information configured and notified by the LMF, where the notification mode may be broadcast, multicast or unicast.

Step 2: the base station judges the type of the current positioning scheme; in response to a downlink-based positioning scheme, proceed to step 3; in response to an uplink-based positioning scheme, proceed to step 4.

Step 3: the base station's operations of the downlink-based positioning scheme:

3.1: the base station sends a DL SSB to the UE according to the DL SSB resource configuration information received from the LMF.

Step 4: the base station's operations of the uplink-based positioning scheme:

4.1: the base station receives and measures a UL SRS sent by the UE according to the UL SRS resource configuration information received from the LMF and obtains the uplink positioning measurements (including TOA, UL-TDOA, UL-AoA, etc.) and the measurement quality;

4.2: the base station reports the uplink positioning measurements and the measurement quality to the LMF as the positioning report.

Embodiment III: DL-TDOA→Multiple Cell-Round Time Trip (Multiple-RTT), Changing the Down Link Channel State Information-Reference Signal (DL CSI-RS) and UL SRS Resource Configuration Information In this Embodiment III, the first positioning reference signal is a reference signal DL CSI-RS for downlink positioning, and the second positioning reference signal includes reference signals DL CSI-RS and UL SRS for uplink and downlink joint positioning; the first positioning scheme is DL-TDOA (i.e., OTDOA), and the second positioning scheme is Multiple-RTT.

Figure 5:
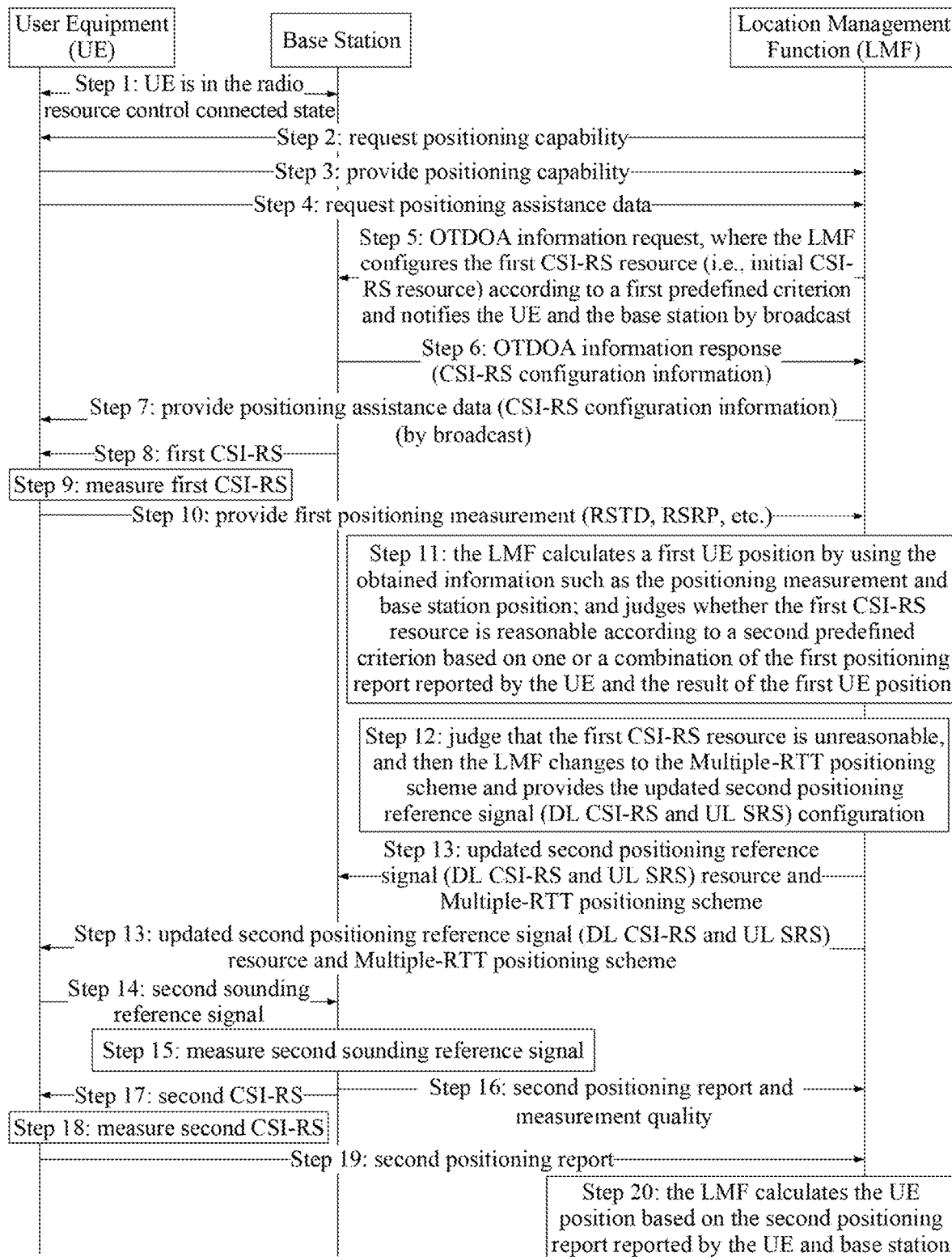
FIG. 5 is a schematic diagram of a UE positioning process according to Embodiment III of the present application.

FIG. 5 shows a UE positioning process of Embodiment III, which specifically includes the following.

Steps 1 to 4: which are the same as steps 1 to 4 shown in FIG. 2, and will not be repeated.

Step 5: in the OTDOA information request, the LMF configures the first CSI-RS resource (i.e., the initial CSI-RS resource) configuration information according to a first predefined criterion, and notifies the UE and the base station by broadcast.

Steps 6 to 10: which are the same as steps 6 to 10 in FIG. 2, and will not be repeated.

Step 11: the LMF calculates a first UE position using the obtained information such as the positioning measurement and base station position; and the LMF judges whether the first CSI-RS resource configuration information is reasonable according to a second predefined criterion based on one or a combination of the first positioning report reported by the UE and the base station, and the calculation result of the first UE position.

Step 12: judge that the first CSI-RS resource configuration information is unreasonable, and then the LMF changes the current positioning scheme to the Multiple-RTT positioning scheme, and provides the updated second positioning reference signal (DL CSI-RS and UL SRS) resource configuration information.

Step 13: the LMF notifies the UE and the base station of the updated second positioning reference signal (DL CSI-RS and UL SRS) resource configuration information and the Multiple-RTT positioning scheme through broadcast, multicast or unicast.

Step 14: the UE sends a UL SRS signal to the base station according to the updated second SRS resource configuration information.

Step 15: the base station measures the second SRS reference signal according to the second SRS resource configuration information, and obtains a second positioning measurement (gNB Rx-Tx Timing).

Step 16: the base station reports the second positioning report (updated gNB Rx-Tx Timing and measurement quality) to the LMF.

Step 17: the UE receives a DL CSI-RS signal (that is, second CSI-RS reference signal) sent by the base station according to the updated second CSI-RS resource configuration information.

Step 18: the UE measures the second CSI-RS reference signal according to the second CSI-RS resource configuration information, and obtains a second positioning measurement (UE Rx-Tx Timing).

Step 19: the UE reports the second positioning report (updated UE Rx-Tx Timing and measurement quality) to the LMF.

Step 20: the LMF calculates the UE position based on the second positioning report (updated UE Rx-Tx Timing and gNB Rx-Tx Timing, and measurement quality) reported by the UE and the base station and the Multiple-RTT positioning scheme.

Here, it should be noted that there is no sequence between steps 14-16 and steps 17-19.

The technical solution provided by the Embodiment III will be introduced below from the LMF, UE, and base station sides, respectively.

The information communication process on the LMF side is illustrated as follows.

The positioning negotiation process of mutual information among the LMF, UE and base station includes the following.

Step 1.0: configure an initial value of N, an initial value of N_MAX, a threshold value of the measurement quality, a threshold value of a measurement variance, and a threshold value of an error coefficient; where the initial value of N is 1, and N_MAX is a positive integer greater than 1 and represents the maximum number of times of positioning negotiation.

Step 1.1: compare N with N_MAX in the $N^{th}$ round of positioning negotiation.

If N>=N_MAX, the positioning negotiation process ends. Otherwise, it is judged whether N is equal to 1.

If N=1, the LMF determines the first DL CSI-RS resource configuration information and the OTDOA positioning scheme according to a first predefined criterion, and proceeds to Step 1.3.

If N>1, the LMF judges whether the current second positioning reference signal resource configuration information is reasonable according to a second predefined criterion.

In response to being reasonable, the current $N^{th}$ round of positioning negotiation process ends, and proceed to step 1.3 based on the current positioning reference signal resource and positioning scheme.

In response to being unreasonable, proceed to step 1.2 and continue with the $N^{th}$ round of positioning negotiation.

Step 1.2: the LMF determines, according to a third predefined criterion, the second positioning reference signal resource to be reconfigured for each base station (including: (1) using a new second positioning reference signal resource configuration; (2) using a Muting mechanism to avoid the interference of the downlink positioning reference signal of each base station based on the second positioning reference signal resource configuration in the previous round) and the second positioning scheme Multiple-RTT, and proceeds to Step 1.3.

Step 1.3: the LMF notifies each UE and base station of the configured first or second positioning reference signal resource configuration information by broadcast, multicast or unicast, and proceeds to Step 1.4.

Step 1.4: the LMF receives a first positioning report or a second positioning report currently reported by the UE and/or the base station, and proceeds to Step 1.5.

Here, the first positioning report is obtained by the UE and each base station through measuring the first positioning reference signal according to the first positioning reference signal resource configuration information configured by the LMF.

The second positioning report is obtained by the UE and each base station through measuring the second positioning reference signal according to the second positioning reference signal resource configuration information configured by the LMF.

Step 1.5: the LMF determines the location of the UE based on the first/second positioning report currently reported by the UE and/or the base station and the positioning scheme, and proceeds to Step 1.6.

Step 1.6: update N=N+1, and proceed to step 1.1.

Here, optionally, the positioning report in step 1.4 and Step 1.5 include: the measurements and the measurement quality reported by the UE and the base station, including two types: 1) the measurement and measurement quality at the UE side, and 2) the measurement and measurement quality at the base station side.

Optionally, the method for determining the measurement and the measurement quality reported by the UE is as follows: the UE receives and measures a DL CSI-RS based on the DL CSI-RS resource configuration information configured and sent by the LMF, and obtains the first type of measurement and measurement quality.

Optionally, the method for determining the measurement and measurement quality reported by the base station is as follows: the base station receives and measures a UL SRS signal sent by the UE based on the UL SRS resource configuration information provided by the LMF, and obtains the second type of measurement and/or measurement quality.

Optionally, the first predefined criterion in step 1.1 includes but is not limited to: the LMF determines the first positioning reference signal resource configuration information according to the lowest positioning performance of all UEs or more than X % UEs (e.g., X=80) covered by the associated base station as well as a pre-configured mapping relationship between positioning reference signal resources and positioning performance (for example, obtained by simulation or fixed configuration).

Optionally, the second predefined criterion in step 1.1 includes but is not limited to one or a combination of three following conditions:

the measurement quality is higher than a preset measurement quality threshold;

the measurement variance is less than a preset threshold of the measurement variance;

the normalized relative position error between a calculation result of a UE position obtained based on the 3GPP positioning scheme and a calculation result of a UE position obtained based on the A-GNSS positioning scheme is less than a preset error coefficient threshold.

Optionally, the third predefined criterion in step 1.2 includes but is not limited to: the LMF determines the second positioning reference signal resource configuration information and the second positioning scheme according to the actual positioning performance of the UE covered by the associated base station as well as a preconfigured mapping relationship between positioning reference signal resources and positioning performance (for example, obtained by simulation or fixed configuration).

Correspondingly, the information communication process on the UE side for example includes the following.

Step 1: the UE receives the positioning reference signal resource configuration information configured and notified by the LMF, where the notification mode may be broadcast, multicast or unicast.

Step 2: the UE judges the type of the current positioning scheme; if it is a downlink-based positioning scheme, proceed to step 3; if it is an uplink-and-downlink-based positioning scheme, proceed to step 5.

Step 3: the UE's operations of the downlink-based positioning scheme:

3.1: the UE receives and measures a DL CSI-RS sent by the base station according to the DL CSI-RS resource configuration information received from the LMF, and obtains the downlink positioning measurements (including TOA, DL-TDOA, DL-AoD, DL-AoA, etc.) and the measurement quality;

3.2: the UE reports the downlink positioning measurement and the measurement quality to the LMF as the positioning report.

Step 5: the UE's operations of the uplink-and-downlink-based positioning scheme:

5.1: the UE receives a DL CSI-RS sent by the base station according to the DL CSI-RS and UL SRS resource configuration information received from the LMF and measures it in combination with a UL SRS, and obtains a positioning measurement (UE Rx-Tx difference) of the combination of uplink and downlink on the UE side and the measurement quality;

5.2: the UE reports the positioning measurement and the measurement quality of the combination of uplink and downlink to the LMF as the positioning report.

The information communication process at the base station side includes the following.

Step 1: the base station receives the positioning reference signal resource configuration information configured and notified by the LMF, where the notification mode may be broadcast, multicast or unicast.

Step 2: the base station judges the type of the current positioning scheme; if it is a downlink-based positioning scheme, proceed to step 3; if it is an uplink-and-downlink-based positioning scheme, proceed to step 5.

Step 3: the base station's operations of the downlink-based positioning scheme:

3.1: the base station sends a DL CSI-RS to the UE according to the DL CSI-RS resource configuration information received from the LMF.

Step 5: the base station's operations of the uplink-and-downlink-based positioning scheme:

5.1: the base station receives a UL SRS sent by the UE according to the DL CSI-RS and UL SRS resource configuration information received from the LMF and measures it in combination with the sending moment of the DL CSI-RS, and obtains a positioning measurement (gNB Rx-Tx difference) and the measurement quality of the combination of uplink and downlink at the base station side; 5.2: the base station reports the positioning measurement and the measurement quality of the combination of uplink and downlink to the LMF as the positioning report.

Figure 6:
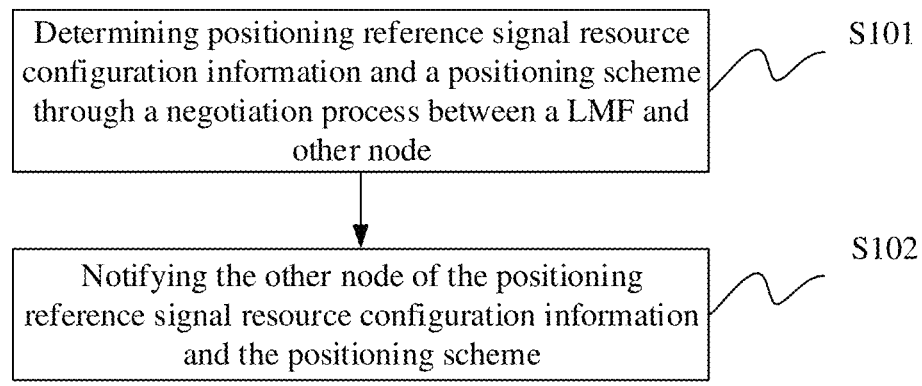
FIG. 6 is a schematic flowchart of an information communication method on the LMF side according to an embodiment of the present application.

To sum up, referring to FIG. 6, on the LMF side, an information communication method provided by an embodiment of the present application includes the following.

S101: determining positioning reference signal resource configuration information and a positioning scheme through a negotiation process between a LMF and other node.

S102: notifying the other node of the positioning reference signal resource configuration information and the positioning scheme.

In S102, for example, the positioning reference signal resource configuration information and the type information of the positioning scheme may be notified to the other node.

Optionally, the other node includes a base stations and/or a terminal.

Optionally, the method further includes:
receiving a positioning report sent by the other node, where the positioning report is obtained by the other node through measuring a positioning reference signal based on the positioning reference signal resource configuration information.

Optionally, the method further includes:
determining a terminal location based on the positioning report.

Optionally, the positioning report includes a positioning measurement and measurement quality obtained by measuring the positioning reference signal and reported by the other node.

Optionally, determining positioning reference signal resource configuration information and a positioning scheme through a negotiation process between a LMF and other node, specifically includes:
determining first positioning reference signal resource configuration information and a first positioning scheme according to a first predefined criterion for a first negotiation process.

Optionally, determining positioning reference signal resource configuration information and a positioning scheme through a negotiation process between a LMF and other node, specifically includes:
judging whether current positioning reference signal resource configuration information and/or positioning scheme is reasonable according to a second predefined criterion for a non-first negotiation process, and determining to adopt the reasonable current positioning reference signal resource configuration information and/or positioning scheme;
where the current positioning reference signal resource configuration information is the first positioning reference signal resource configuration information, or second positioning reference signal resource configuration information re-determined according to a third predefined criterion; and the current positioning scheme is the first positioning scheme, or a second positioning scheme re-determined according to the third predefined criterion.

It should be noted that, in the embodiment of the present application, for the second negotiation process, the first positioning reference signal resource configuration information is firstly assigned as the second positioning reference signal resource configuration information, and the first positioning scheme is assigned as the second positioning scheme. Then it is judged, according to the second predefined criterion, whether the current positioning reference signal resource configuration information and/or the positioning scheme is reasonable, so the current positioning reference signal resource configuration information is the second positioning reference signal resource configuration information, and the current positioning scheme is the second positioning scheme.

In addition, it should also be noted that, in the embodiment of the present application, the second positioning reference signal resource configuration information may be re-determined and/or the second positioning scheme may be re-determined using the third predefined criterion.

Optionally, notifying the other node of the positioning reference signal resource configuration information and the positioning scheme, includes: notifying the other node of the reasonable current positioning reference signal resource configuration information and current positioning scheme determined according to the second predefined criterion.

Optionally, if it is determined that the current positioning reference signal resource configuration information is unreasonable according to the second predefined criterion, the second positioning reference signal resource configuration information and/or the second positioning scheme is/are further determined according to the third predefined criterion.

Optionally, the first predefined criterion includes:
determining the first positioning reference signal resource configuration information according to lowest positioning performance of all terminals or a part of terminals covered by a base station associated with the LMF as well as a preconfigured mapping relationship between positioning reference signal resources and positioning performance.

Optionally, the second predefined criterion includes: determining that the second positioning reference signal resource configuration information and the second positioning scheme are reasonable in response to one or a combination of following conditions being satisfied; otherwise, determining that the second positioning reference signal resource configuration information and the second positioning scheme are unreasonable:
- condition 1: measurement quality is higher than a preset measurement quality threshold;
- condition 2: a measurement variance is less than a preset threshold of the measurement variance;
- condition 3: a normalized relative position error between a calculation result of a terminal position obtained based on a 3GPP positioning scheme and a calculation result of a terminal position obtained based on an A-GNSS positioning scheme is less than a preset position error threshold.

Optionally, the third predefined criterion includes:
determining the second positioning reference signal resource configuration information and/or the second positioning scheme according to actual positioning performance of a terminal in a base station associated with the LMF as well as a preconfigured mapping relationship between positioning reference signal resources and positioning performance of positioning schemes.

Figure 7:
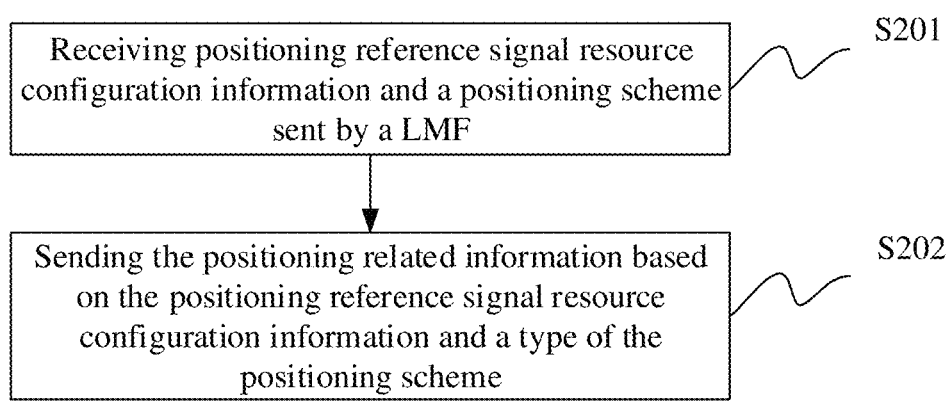
FIG. 7 is a schematic flowchart of an information communication method applicable to both the terminal side and the base station side according to an embodiment of the present application.

Correspondingly, referring to FIG. 7, an information communication method applicable to the other node side, such as the terminal side and the base station side, includes the following.

S201: receiving positioning reference signal resource configuration information and a positioning scheme sent by a LMF; where the positioning reference signal resource configuration information and the positioning scheme are determined through a negotiation process between the LMF and other node.

It should be noted that the above-mentioned positioning reference signal resource configuration information includes uplink positioning reference signal resource configuration information and downlink positioning reference signal resource configuration information, which will not be repeated here.

S202: sending the positioning related information based on the positioning reference signal resource configuration information and a type of the positioning scheme.

Optionally, the positioning scheme is one of following schemes:
- a downlink-based positioning scheme;
- an uplink-based positioning scheme;
- an uplink-and-downlink-based positioning scheme.

At the Terminal Side

Optionally, if the positioning scheme is a downlink-based positioning scheme, then sending the positioning related information includes:
receiving and measuring a downlink positioning reference signal sent by a base station according to downlink positioning reference signal resource configuration information received from the LMF, and obtains a downlink positioning measurement and measurement quality;
sending the downlink positioning measurement and the measurement quality to the LMF as a positioning report.

Optionally, if the positioning scheme is an uplink-based positioning scheme, then sending the positioning related information specifically includes:
sending an uplink positioning reference signal to a base station according to uplink positioning reference signal resource configuration information received from the LMF or the base station.

Optionally, if the positioning scheme is an uplink-based positioning scheme and downlink, then sending the positioning related information specifically includes:
receiving a downlink positioning reference signal sent by a base station and measuring it in combination with an uplink positioning reference signal according to downlink positioning reference signal resource configuration information and uplink positioning reference signal resource configuration information received from the LMF, and obtains a positioning measurement and measurement quality of a combination of uplink and downlink on a terminal side;
sending the positioning measurement and the measurement quality of the combination of uplink and downlink at the terminal side to the LMF as a positioning report.

At the Base Station Side

Optionally, if the positioning scheme is a downlink-based positioning scheme, then sending the positioning related information specifically includes:
sending a downlink positioning reference signal to a terminal according to downlink positioning reference signal resource configuration information received from the LMF.

Optionally, if the positioning scheme is an uplink-based positioning scheme, then sending the positioning related information specifically includes:
receiving and measuring an uplink positioning reference signal sent by a terminal according to uplink positioning reference signal resource configuration information received from the LMF, and obtains an uplink positioning measurement and measurement quality;
reporting the uplink positioning measurement and the measurement quality to the LMF as a positioning report.

Optionally, if the positioning scheme is an uplink-based positioning scheme and downlink, then sending the positioning related information specifically includes:
receiving an uplink positioning reference signal sent by a terminal and measuring it in combination with a sending moment of a downlink positioning reference signal according to downlink positioning reference signal resource configuration information and uplink positioning reference signal resource configuration information received from the LMF, and obtains a positioning measurement and measurement quality of a combination of uplink and downlink at a base station side;
sending the positioning measurement and the measurement quality of the combination of uplink and downlink at the base station side to the LMF as a positioning report.

Optionally, the downlink reference signal includes one or a combination of: an NR PRS, a CSI-RS, an SSB.

Optionally, the uplink reference signal includes a UL SRS.

Optionally, the positioning scheme includes one of following positioning schemes: various downlink-based positioning schemes, uplink-based positioning schemes, and uplink-and-downlink-based positioning schemes supported by 3GPP.

Figure 8:
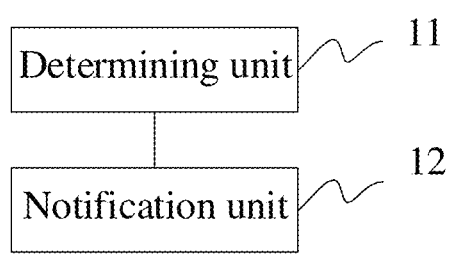
FIG. 8 is a structural schematic diagram of an information communication apparatus on the LMF side according to an embodiment of the present application.

Referring to FIG. 8, an information communication device on the LMF side provided by an embodiment of the present application includes:
- a determining unit 11 configured to determine positioning reference signal resource configuration information and a positioning scheme through a negotiation process between a LMF and other node;
- a notification unit 12 configured to notify the other node of the positioning reference signal resource configuration information and the positioning scheme.

Optionally, the other node includes a base stations and/or a terminal.

Optionally, the determining unit is further configured to:
receive a positioning report sent by the other node, where the positioning report is obtained by the other node through measuring a positioning reference signal based on the positioning reference signal resource configuration information.

Optionally, the determining unit is further configured to:
determine a terminal location based on the positioning report.

Optionally, the positioning report includes a positioning measurement and measurement quality obtained by measuring the positioning reference signal and reported by the other node.

Optionally, when determining positioning reference signal resource configuration information and a positioning scheme through a negotiation process between a LMF and other node, the determining unit is specifically configured to:
determine first positioning reference signal resource configuration information and a first positioning scheme according to a first predefined criterion for a first negotiation process.

Optionally, when determining positioning reference signal resource configuration information and a positioning scheme through a negotiation process between a LMF and other node, the determining unit is specifically configured to:
judge whether current positioning reference signal resource configuration information and/or positioning scheme is reasonable according to a second predefined criterion for a non-first negotiation process, and determine to adopt the reasonable current positioning reference signal resource configuration information and/or positioning scheme;
where the current positioning reference signal resource configuration information is the first positioning reference signal resource configuration information, or second positioning reference signal resource configuration information re-determined according to a third predefined criterion; and the current positioning scheme is the first positioning scheme, or a second positioning scheme re-determined according to the third predefined criterion.

Optionally, notifying the other node of the positioning reference signal resource configuration information and the positioning scheme, includes: notifying the other node of the reasonable current positioning reference signal resource configuration information and current positioning scheme determined according to the second predefined criterion.

Optionally, if it is determined that the current positioning reference signal resource configuration information is unreasonable according to the second predefined criterion, the second positioning reference signal resource configuration information and/or the second positioning scheme is/are further determined according to the third predefined criterion.

Optionally, the first predefined criterion includes:
determining the first positioning reference signal resource configuration information according to lowest positioning performance of all terminals or a part of terminals covered by a base station associated with the LMF as well as a preconfigured mapping relationship between positioning reference signal resources and positioning performance.

Optionally, the second predefined criterion includes:
determining that the second positioning reference signal resource configuration information and the second positioning scheme are reasonable in response to one or a combination of following conditions being satisfied; otherwise, determining that the second positioning reference signal resource configuration information and the second positioning scheme are unreasonable:
condition 1: measurement quality is higher than a preset measurement quality threshold;
condition 2: a measurement variance is less than a preset threshold of the measurement variance;
condition 3: a normalized relative position error between a calculation result of a terminal position obtained based on a 3GPP positioning scheme and a calculation result of a terminal position obtained based on an A-GNSS positioning scheme is less than a preset position error threshold.

Optionally, the third predefined criterion includes:
determining the second positioning reference signal resource configuration information and/or the second positioning scheme according to actual positioning performance of a terminal in a base station associated with the LMF as well as a preconfigured mapping relationship between positioning reference signal resources and positioning performance of positioning schemes.

It should be noted here that the above-mentioned information communication device on the LMF side provided by the embodiment of the present application can implement all the method steps implemented in the above-mentioned embodiments of the information communication method on the LMF side, and can achieve the same technical effects. The beneficial effects of this embodiment will not be described in detail here.

Figure 9:
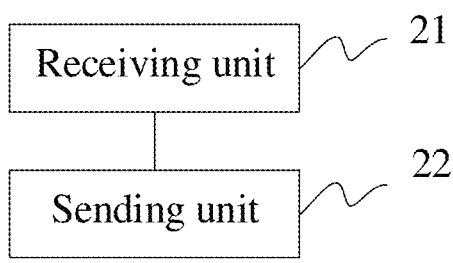
FIG. 9 is a structural schematic diagram of an information communication apparatus applicable to both the terminal side and the base station side according to an embodiment of the present application.

Referring to FIG. 9, an information communication device applicable to both the terminal side and the base station side provided by an embodiment of the present application includes:
- a receiving unit 21 configured to receive positioning reference signal resource configuration information and a positioning scheme sent by a LMF; where the positioning reference signal resource configuration information and the positioning scheme are determined through a negotiation process between the LMF and other node;
- a sending unit 22 configured to send the positioning related information based on the positioning reference signal resource configuration information and a type of the positioning scheme.

Optionally, the positioning scheme is one of following schemes:
- a downlink-based positioning scheme;
- an uplink-based positioning scheme;
- an uplink-and-downlink-based positioning scheme.

At the Terminal Side

Optionally, if the positioning scheme is a downlink-based positioning scheme, then sending the positioning related information specifically includes:
- receiving and measuring a downlink positioning reference signal sent by a base station according to downlink positioning reference signal resource configuration information received from the LMF, and obtaining a downlink positioning measurement and measurement quality;
- sending the downlink positioning measurement and the measurement quality to the LMF as a positioning report.

Optionally, if the positioning scheme is an uplink-based positioning scheme, then sending the positioning related information specifically includes:
- sending an uplink positioning reference signal to a base station according to uplink positioning reference signal resource configuration information received from the LMF or the base station.

Optionally, if the positioning scheme is an uplink-based positioning scheme and downlink, then sending the positioning related information specifically includes:
- receiving a downlink positioning reference signal sent by a base station and measuring it in combination with an uplink positioning reference signal according to downlink positioning reference signal resource configuration information and uplink positioning reference signal resource configuration information received from the LMF, and obtaining a positioning measurement of a combination of uplink and downlink on a terminal side and measurement quality;
- sending the positioning measurement and the measurement quality of the combination of uplink and downlink at the terminal side to the LMF as a positioning report.

At the Base Station Side

Optionally, if the positioning scheme is a downlink-based positioning scheme, then sending the positioning related information specifically includes:
- sending a downlink positioning reference signal to a terminal according to downlink positioning reference signal resource configuration information received from the LMF.

Optionally, if the positioning scheme is an uplink-based positioning scheme, then sending the positioning related information specifically includes:
- receiving and measuring an uplink positioning reference signal sent by a terminal according to uplink positioning reference signal resource configuration information received from the LMF, and obtaining an uplink positioning measurement and measurement quality;
- reporting the uplink positioning measurement and the measurement quality to the LMF as a positioning report.

Optionally, if the positioning scheme is an uplink-and-downlink-based positioning scheme, then sending the positioning related information specifically includes:
- receiving an uplink positioning reference signal sent by a terminal and measuring it in combination with a sending moment of a downlink positioning reference signal according to downlink positioning reference signal resource configuration information and uplink positioning reference signal resource configuration information received from the LMF, and obtaining a positioning measurement and measurement quality of a combination of uplink and downlink at a base station side;
- sending the positioning measurement and the measurement quality of the combination of uplink and downlink at the base station side to the LMF as a positioning report.

Optionally, the downlink reference signal includes one or a combination of: an NR PRS, a CSI-RS, an SSB.

Optionally, the uplink reference signal includes a UL SRS.

Optionally, the positioning scheme includes one of following positioning schemes: various downlink-based positioning schemes, uplink-based positioning schemes, and uplink-and-downlink-based positioning schemes supported by 3GPP.

It should be noted here that the above-mentioned information communication device applicable to both the terminal side and the base station side provided by the embodiment of the present application can implement all the method steps implemented in the above-mentioned embodiments of the information communication method applicable to both the terminal side and the base station side, and can achieve the same technical effects. The beneficial effects of this embodiment will not be described in detail here.

Figure 10:
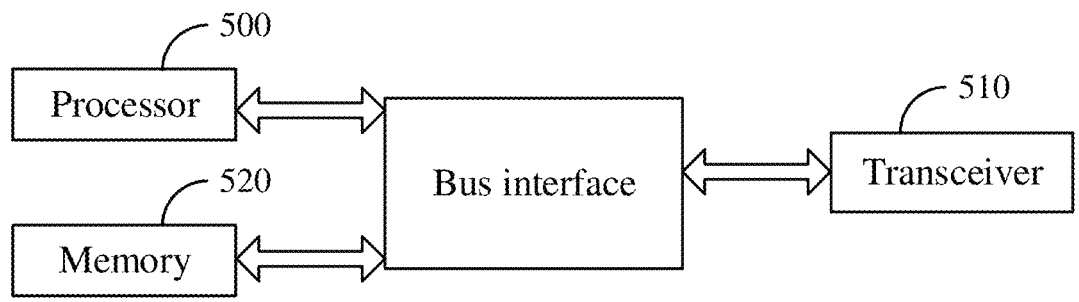
FIG. 10 is a structural schematic diagram of another information communication apparatus at the LMF side according to an embodiment of the present application.

Referring to FIG. 10, an information communication device on the LMF side provided by an embodiment of the present application includes:
- a memory 520 configured to store program instructions;
- a processor 500 configured to invoke the program instructions stored in the memory, and execute according to an obtained program:
  - determining positioning reference signal resource configuration information and a positioning scheme through a negotiation process between a LMF and other node;
  - notifying the other node of the positioning reference signal resource configuration information and the positioning scheme via a transceiver 510.

Optionally, the other node includes a base stations and/or a terminal.

Optionally, the processor is further configured to:
- receive a positioning report sent by the other node, where the positioning report is obtained by the other node through measuring a positioning reference signal based on the positioning reference signal resource configuration information.

Optionally, the processor is further configured to:
- determine a terminal location based on the positioning report.

Optionally, the positioning report includes a positioning measurement and measurement quality obtained by measuring the positioning reference signal and reported by the other node.

Optionally, when determining positioning reference signal resource configuration information and a positioning scheme through a negotiation process between a LMF and other node, the processor is specifically configured to:
- determine first positioning reference signal resource configuration information and a first positioning scheme according to a first predefined criterion for a first negotiation process.

Optionally, when determining positioning reference signal resource configuration information and a positioning scheme through a negotiation process between a LMF and other node, the processor is specifically configured to:

judge whether current positioning reference signal resource configuration information and/or positioning scheme is reasonable according to a second predefined criterion for a non-first negotiation process, and determine to adopt the reasonable current positioning reference signal resource configuration information and/or positioning scheme;

where the current positioning reference signal resource configuration information is the first positioning reference signal resource configuration information, or second positioning reference signal resource configuration information re-determined according to a third predefined criterion; and the current positioning scheme is the first positioning scheme, or a second positioning scheme re-determined according to the third predefined criterion.

Optionally, notifying the other node of the positioning reference signal resource configuration information and the positioning scheme, includes: notifying the other node of the reasonable current positioning reference signal resource configuration information and current positioning scheme determined according to the second predefined criterion.

Optionally, if it is determined that the current positioning reference signal resource configuration information is unreasonable according to the second predefined criterion, the second positioning reference signal resource configuration information and/or the second positioning scheme is/are further determined according to the third predefined criterion.

Optionally, the first predefined criterion includes:
determining the first positioning reference signal resource configuration information according to lowest positioning performance of all terminals or a part of terminals covered by a base station associated with the LMF as well as a preconfigured mapping relationship between positioning reference signal resources and positioning performance.

Optionally, the second predefined criterion includes: determining that the second positioning reference signal resource configuration information and the second positioning scheme are reasonable in response to one or a combination of following conditions being satisfied; otherwise, determining that the second positioning reference signal resource configuration information and the second positioning scheme are unreasonable:

condition 1: measurement quality is higher than a preset measurement quality threshold;
condition 2: a measurement variance is less than a preset threshold of the measurement variance;
condition 3: a normalized relative position error between a calculation result of a terminal position obtained based on a 3GPP positioning scheme and a calculation result of a terminal position obtained based on an A-GNSS positioning scheme is less than a preset position error threshold.

Optionally, the third predefined criterion includes:
determining the second positioning reference signal resource configuration information and/or the second positioning scheme according to actual positioning performance of a terminal in a base station associated with the LMF as well as a preconfigured mapping relationship between positioning reference signal resources and positioning performance of positioning schemes.

The transceiver 510 is configured to receive and send the data under the control of the processor 500.

Here, in FIG. 10, the bus architecture can include any numbers of interconnected buses and bridges, and specifically link various circuits of one or more processors represented by the processor 500 and the memory represented by the memory 520. The bus architecture may further link various other circuits such as peripheral device, voltage regulator and power management circuit, which are all well known in the art and thus will not be further described again herein. The bus interface provides an interface. The transceiver 510 may be a plurality of elements, i.e., include a transmitter and a receiver, and provide the units for communicating with various other devices over the transmission media. The processor 500 is responsible for managing the bus architecture and general processing, and the memory 520 may store the data used by the processor 500 when performing the operations.

The processor 500 may be Central Processing Unit (CPU), Application Specific Integrated Circuit (ASIC), Field-Programmable Gate Array (FPGA) or Complex Programmable Logic Device (CPLD). It should be noted here that the above-mentioned information communication device on the LMF side provided by the embodiment of the present application can implement all the method steps implemented in the above-mentioned embodiments of the information communication method on the LMF side, and can achieve the same technical effects. The beneficial effects of this embodiment will not be described in detail here.

Figure 11:
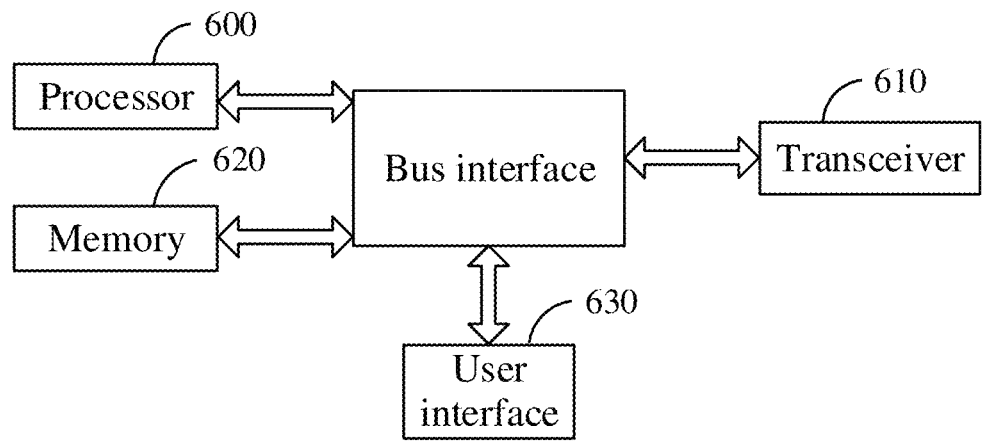
FIG. 11 is a structural schematic diagram of another information communication apparatus at the terminal side according to an embodiment of the present application.

Referring to FIG. 11, another information communication device at the terminal side provided by an embodiment of the present application includes:

a memory 620 configured to store program instructions;
a processor 600 configured to invoke the program instructions stored in the memory, and execute according to an obtained program:
receiving positioning reference signal resource configuration information and a positioning scheme sent by a LMF; where the positioning reference signal resource configuration information and the positioning scheme are determined through a negotiation process between the LMF and other node;
sending the positioning related information based on the positioning reference signal resource configuration information and a type of the positioning scheme.

Optionally, the positioning scheme is one of following schemes:
a downlink-based positioning scheme;
an uplink-based positioning scheme;
an uplink-and-downlink-based positioning scheme.

Optionally, if the positioning scheme is a downlink-based positioning scheme, then sending the positioning related information specifically includes:
receiving and measuring a downlink positioning reference signal sent by a base station according to downlink positioning reference signal resource configuration information received from the LMF, and obtaining a downlink positioning measurement and measurement quality;
sending the downlink positioning measurement and the measurement quality to the LMF as a positioning report.

Optionally, if the positioning scheme is an uplink-based positioning scheme, then sending the positioning related information specifically includes:

sending an uplink positioning reference signal to a base station according to uplink positioning reference signal resource configuration information received from the LMF or the base station.

Optionally, if the positioning scheme is an uplink-and-downlink-based positioning scheme, then sending the positioning related information specifically includes:

receiving a downlink positioning reference signal sent by a base station and measuring it in combination with an uplink positioning reference signal according to downlink positioning reference signal resource configuration information and uplink positioning reference signal resource configuration information received from the LMF, and obtaining a positioning measurement of a combination of uplink and downlink on a terminal side and measurement quality;

sending the positioning measurement and the measurement quality of the combination of uplink and downlink at the terminal side to the LMF as a positioning report.

The positioning reference signal resource configuration information and the positioning scheme sent by the LMF are received via a transceiver 610; where the positioning reference signal resource configuration information and the positioning scheme are determined through a negotiation process between the LMF and other node.

The positioning related information is sent via the transceiver 610 based on the positioning reference signal resource configuration information and the type of the positioning scheme.

The transceiver 610 is configured to receive and send the data under the control of the processor 600.

Here, in FIG. 11, the bus architecture can include any numbers of interconnected buses and bridges, and specifically link various circuits of one or more processors represented by the processor 600 and the memory represented by the memory 620. The bus architecture may further link various other circuits such as peripheral device, voltage regulator and power management circuit, which are all well known in the art and thus will not be further described again herein. The bus interface provides an interface. The transceiver 610 may be a plurality of elements, i.e., include a transmitter and a receiver, and provide the units for communicating with various other devices over the transmission media. For different user equipment, the user interface 630 may also be the interface capable of inter-connecting or exter-connecting with the required devices, and the connected devices include but not limited to keypad, display, loudspeaker, microphone, joystick and the like.

The processor 600 is responsible for managing the bus architecture and general processing, and the memory 620 may store the data used by the processor 600 when performing the operations.

Optionally, the processor 600 may be Central Processing Unit (CPU), Application Specific Integrated Circuit (ASIC), Field-Programmable Gate Array (FPGA) or Complex Programmable Logic Device (CPLD). It should be noted here that the above-mentioned information communication device applicable to the terminal side provided by the embodiment of the present application can implement all the method steps implemented in the above-mentioned embodiments of the information communication method applicable to the terminal side, and can achieve the same technical effects. The beneficial effects of this embodiment will not be described in detail here.

Figure 12:
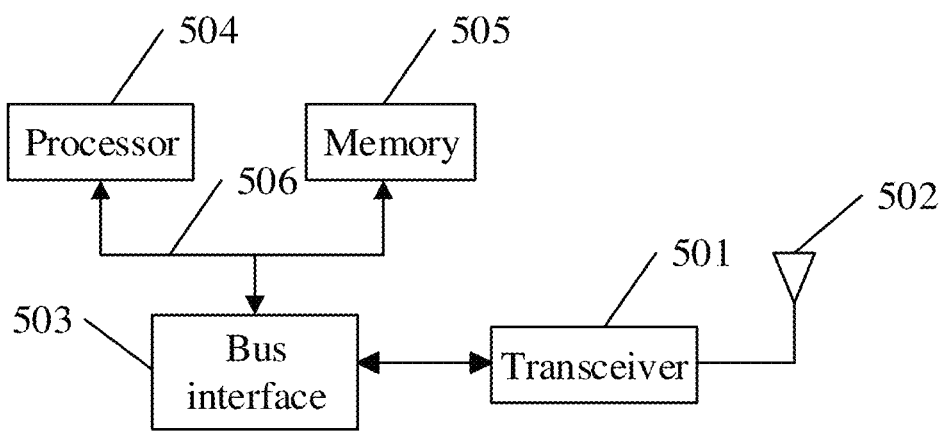
FIG. 12 is a structural schematic diagram of another information communication apparatus at the base station side according to an embodiment of the present application.

Referring to FIG. 12, another information communication device at the base station side provided by an embodiment of the present application includes:

a memory 505 configured to store program instructions;

a processor 504 configured to invoke the program instructions stored in the memory, and in accordance with the obtained program, perform the process of:

receiving positioning reference signal resource configuration information and a positioning scheme sent by a Location Management Function (LMF); where the positioning reference signal resource configuration information and the positioning scheme are determined through a negotiation process between the LMF and other node;

sending the positioning related information based on the positioning reference signal resource configuration information and a type of the positioning scheme.

Optionally, the positioning scheme is one of following schemes:

a downlink-based positioning scheme;

an uplink-based positioning scheme;

an uplink-and-downlink-based positioning scheme.

Optionally, if the positioning scheme is a downlink-based positioning scheme, then sending the positioning related information specifically includes:

sending a downlink positioning reference signal to a terminal according to downlink positioning reference signal resource configuration information received from the LMF.

Optionally, if the positioning scheme is an uplink-based positioning scheme, then sending the positioning related information specifically includes:

receiving and measuring an uplink positioning reference signal sent by a terminal according to uplink positioning reference signal resource configuration information received from the LMF, and obtaining an uplink positioning measurement and measurement quality;

reporting the uplink positioning measurement and the measurement quality to the LMF as a positioning report.

Optionally, if the positioning scheme is an uplink-and-downlink-based positioning scheme, then sending the positioning related information specifically includes:

receiving an uplink positioning reference signal sent by a terminal and measuring it in combination with a sending moment of a downlink positioning reference signal according to downlink positioning reference signal resource configuration information and uplink positioning reference signal resource configuration information received from the LMF, and obtaining a positioning measurement and measurement quality of a combination of uplink and downlink at the base station side;

sending the positioning measurement and the measurement quality of the combination of uplink and downlink at the base station side to the LMF as a positioning report.

Optionally, the downlink reference signal includes one or a combination of: an NR PRS, a CSI-RS, an SSB.

Optionally, the uplink reference signal includes a UL SRS.

Optionally, the positioning scheme includes one of following positioning schemes: various downlink-based positioning schemes, uplink-based positioning schemes, and uplink-and-downlink-based positioning schemes supported by 3GPP.

The positioning reference signal resource configuration information and the positioning scheme sent by the LMF are received via a transceiver 501; where the positioning reference signal resource configuration information and the positioning scheme are determined through a negotiation process between the LMF and other node.

The positioning related information is sent via the transceiver 501 based on the positioning reference signal resource configuration information and the type of the positioning scheme.

The transceiver 501 is configured to receive and send the data under the control of the processor 504.

In FIG. 12, the bus architecture is represented by the bus 506. The bus 506 can include any numbers of interconnected buses and bridges, and the bus 506 links various circuits including one or more processors represented by the processor 504 and the memory represented by the memory 505. The bus 506 may further link various other circuits such as peripheral device, voltage regulator and power management circuit, which are all well known in the art and thus will not be further described again herein. The bus interface 503 provides an interface between the bus 506 and the transceiver 501. The transceiver 501 can be one element or can be a plurality of elements, i.e., a plurality of receiver and transmitter, and provide the units for communicating with various other devices over the transmission media. The data processed by the processor 504 is transmitted over the wireless medium via the antenna 502, and further, the antenna 502 also receives the data and transfers the data to the processor 504.

The processor 504 is responsible for managing the bus 506 and the general processing, and can further provide various functions including timing, peripheral interface, voltage regulation, power management and other control functions. The memory 505 can be used to store the data used by the processor 504 when performing the operations.

Optionally, the processor 504 may be Central Processing Unit (CPU), Application Specific Integrated Circuit (ASIC), Field-Programmable Gate Array (FPGA) or Complex Programmable Logic Device (CPLD).

It should be noted here that the above-mentioned information communication device applicable to the base station side provided by the embodiment of the present application can implement all the method steps implemented in the above-mentioned embodiments of the information communication method applicable to the base station side, and can achieve the same technical effects. The beneficial effects of this embodiment will not be described in detail here.

It should be noted that the division of units in the embodiments of the present application is illustrative, and is merely a kind of logical function division, and there may be other division methods in actual implementations. In addition, the functional units in each embodiment of the present application may be integrated into one processing unit, or each unit may exist alone physically, or two or more units may be integrated into one unit. The above-mentioned integrated units can be implemented in the form of hardware, or can be implemented in the form of software functional units.

When the integrated unit is implemented in the form of software functional unit and sold or used as an independent product, it may be stored in a computer readable storage medium. Based on such understanding, the technical solution of the present application essentially or a part that contributes to the prior art or all or a part of the technical solution may be embodied in the form of software product. The computer software product is stored in a storage medium, and includes several instructions used to enable a computer device (which may be a personal computer, server, or network device, etc.) or a processor to perform all or some of the steps of the methods of various embodiments of the present application. The above-mentioned storage medium includes: USB flash drive, mobile hard disk, Read-Only Memory (ROM), Random Access Memory (RAM), magnetic disk or compact disc or various media that can store the program codes.

An embodiment of the present application provides a computing device, which can specifically be a desktop computer, a portable computer, a smart phone, a tablet computer, a Personal Digital Assistant (PDA) or the like. The computing device can include a Center Processing Unit (CPU), a memory, input/output devices and the like. The input device can include a keyboard, a mouse, a touch screen and the like, and the output device can include a display device such as Liquid Crystal Display (LCD), Cathode Ray Tube (CRT) or the like.

The memory can include a Read-Only Memory (ROM) and a Random Access Memory (RAM), and provide the program instructions and data stored in the memory to the processor. In an embodiment of the present application, the memory may be used to store the program of any one of the methods provided by the embodiments of the present application.

The processor invokes the program instructions stored in the memory and is configured to perform any one of the methods provided by the embodiments of the present application in accordance with the obtained program instructions.

An embodiment of the present application provides a computer storage medium for storing the computer program instructions used by the apparatuses provided by the embodiments of the present application described above, where the computer storage medium contains the program for performing any one of the methods provided by the embodiments of the present application described above.

The computer storage medium may be any available medium or data storage device accessible to the computer, including but not limited to: magnetic memory (e.g., floppy disk, hard disk, magnetic tape, Magneto-Optical disc (MO), etc.), optical memory (e.g., Compact Disc (CD), Digital Versatile Disc (DVD), Blu-ray Disc (BD), High-definition Versatile Disc (HVD), etc.), and semiconductor memory (e.g., ROM, Erasable Programmable Read-Only Memory (EPROM), Electrically Erasable Programmable Read Only Memory (EEPROM), Non-volatile Memory (NAND FLASH), Solid State Disk/Solid State Drive (SSD)), etc.

The methods provided by the embodiments of the present application may be applied to the terminal devices, and may also be applied to the network devices.

Here, the terminal device can also referred to as the User Equipment ("UE" for short), Mobile Station ("MS" for short), Mobile Terminal ("MT" for short) or the like. Optionally, the terminal can has the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

The network device may be a base station (e.g., access point), which means the device in the access network communicating with the wireless terminal via one or more sectors over the air interface. The base station may be used to perform the inter-conversion between the received air frame and the IP packet, and used as the router between the wireless terminal and the rest of the access network, where the rest of the access network may include Internet Protocol (IP) networks. The base station may further coordinate the attribute management of the air interface. For example, the base station can be the BTS in the GSM or CDMA, or can be the NodeB in the WCDMA, or can be the NodeB or eNB or e-NodeB (evolutional Node B) in the LTE, or can be the gNB in the 5G system, or the like, which is not limited in the embodiments of the present application.

The processing flows of the above methods may be implemented by a software program, which may be stored in a storage medium. When the stored software program is invoked, the above method steps are performed.

To sum up, the embodiments of the present application propose an LMF-coordinated positioning solution, which solves the following problems that may exist in the existing solutions.

1. There is no negotiation of the configuration information of the DL PRS among the base stations. The adjacent base stations may send the DL PRSs on the same time and frequency resources, so that the DL PRS signals of the adjacent base stations interfere with each other, resulting in the degradation of the performance of the downlink positioning measurements.

2. Each base station cannot be supported to optimally configure the DL PRS signal according to the positioning performance requirements of the UE. For example, sometimes the time and frequency resources configured by the base station for the DL PRS may be insufficient (for example, the bandwidth of the DL PRS is too small, the density of the time-frequency domain resources is too low, etc.), and the positioning performance requirements of the UE cannot be met; and sometimes the time and frequency resources configured by the base station for the DL PRS are too wasteful, and the wireless system communication is adversely affected due to the waste of resources.

It should be understood by those skilled in the art that the embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Evidently those skilled in the art can make various modifications and variations to the present application without departing from the spirit and scope of the present application. Thus the present application is also intended to encompass these modifications and variations therein as long as these modifications and variations to the present application come into the scope of the claims of the present application and their equivalents.

What is claimed is:

1. An information communication method, comprising:
   determining positioning reference signal resource configuration information and a positioning scheme through a negotiation process between a Location Management Function, LMF, and other node; wherein the negotiation process is an interaction process of positioning related information;
   notifying the other node of the positioning reference signal resource configuration information and the positioning scheme;
   wherein determining positioning reference signal resource configuration information and a positioning scheme through a negotiation process between a LMF and other node, comprises:
   determining first positioning reference signal resource configuration information and a first positioning scheme according to a first predefined criterion for a first negotiation process;
   judging whether current positioning reference signal resource configuration information and/or positioning scheme is reasonable according to a second predefined criterion for a non-first negotiation process, and determining to adopt reasonable current positioning reference signal resource configuration information and/or positioning scheme;
   wherein the reasonable current positioning reference signal resource configuration information is the first positioning reference signal resource configuration information, or second positioning reference signal resource configuration information re-determined according to a third predefined criterion; and the reasonable current positioning scheme is the first positioning scheme, or a second positioning scheme re-determined according to the third predefined criterion;
   wherein notifying the other node of the positioning reference signal resource configuration information and the positioning scheme, comprises:
   notifying the other node of the reasonable current positioning reference signal resource configuration information and current positioning scheme determined according to the second predefined criterion;
   if it is determined that the current positioning reference signal resource configuration information is unreasonable according to the second predefined criterion, determining the second positioning reference signal resource configuration information and/or the second positioning scheme according to the third predefined criterion.

2. The method according to claim 1, wherein the other node comprises a terminal and/or a base station.

3. The method according to claim 1, further comprising:
receiving a positioning report sent by the other node, wherein the positioning report is obtained by the other node through measuring a positioning reference signal based on the positioning reference signal resource configuration information.

4. The method according to claim 3, further comprising:
determining a terminal location based on the positioning report;
wherein the positioning report comprises a positioning measurement and measurement quality obtained by the other node through measuring the positioning reference signal and reported by the other node.

5. The method according to claim 1, wherein
the first predefined criterion comprises:
determining the first positioning reference signal resource configuration information according to lowest positioning performance of all terminals or a part of terminals covered by all base stations associated with the LMF as well as a preconfigured mapping relationship between positioning reference signal resources and positioning performance;
the second predefined criterion comprises: in response to one or a combination of following conditions being satisfied, determining that the second positioning reference signal resource configuration information and the second positioning scheme are reasonable; otherwise, determining that the second positioning reference signal resource configuration information and the second positioning scheme are unreasonable:
condition 1: measurement quality is higher than a preset measurement quality threshold;
condition 2: a measurement variance is less than a preset threshold of the measurement variance; or
condition 3: a normalized relative position error between a calculation result of a terminal position obtained based on a third Generation Partnership Project positioning scheme and a calculation result of a terminal position obtained based on an Assisting-Global Navigation Satellite System positioning scheme is less than a preset position error threshold;
the third predefined criterion comprises:
determining the second positioning reference signal resource configuration information and/or the second positioning scheme according to actual positioning performance of a terminal in a base station associated with the LMF as well as a preconfigured mapping relationship between positioning reference signal resources and positioning performance of positioning schemes.

6. An information communication method, comprising:
receiving positioning reference signal resource configuration information and a positioning scheme sent by a Location Management Function, LMF; wherein the positioning reference signal resource configuration information and the positioning scheme are determined through a negotiation process between the LMF and other node; wherein the negotiation process is an interactive process of positioning related information;
sending the positioning related information based on the positioning reference signal resource configuration information and a type of the positioning scheme;
wherein the positioning scheme is one of following schemes:
a downlink-based positioning scheme;
an uplink-based positioning scheme; or
an uplink-and-downlink-based positioning scheme;
wherein the positioning reference signal resource configuration information and the positioning scheme are determined through the negotiation process between the LMF and other node by:
determining first positioning reference signal resource configuration information and a first positioning scheme according to a first predefined criterion for a first negotiation process;
judging whether current positioning reference signal resource configuration information and/or positioning scheme is reasonable according to a second predefined criterion for a non-first negotiation process, and determining to adopt reasonable current positioning reference signal resource configuration information and/or positioning scheme;
wherein the reasonable current positioning reference signal resource configuration information is the first positioning reference signal resource configuration information, or second positioning reference signal resource configuration information re-determined according to a third predefined criterion; and the reasonable current positioning scheme is the first positioning scheme, or a second positioning scheme re-determined according to the third predefined criterion;
wherein if it is determined that the current positioning reference signal resource configuration information is unreasonable according to the second predefined criterion, the second positioning reference signal resource configuration information and/or the second positioning scheme is determined according to the third predefined criterion.

7. The method according to claim 6, wherein
if the positioning scheme is a downlink-based positioning scheme, the sending the positioning related information comprises:
receiving and measuring a downlink positioning reference signal sent by a base station according to downlink positioning reference signal resource configuration information received from the LMF, and obtaining a downlink positioning measurement and measurement quality;
sending the downlink positioning measurement and the measurement quality to the LMF as a positioning report;
or
if the positioning scheme is an uplink-based positioning scheme, the sending the positioning related information comprises:
sending an uplink positioning reference signal to a base station according to uplink positioning reference signal resource configuration information received from the LMF or the base station;
or
if the positioning scheme is an uplink-and-downlink-based positioning scheme, the sending the positioning related information comprises:
receiving a downlink positioning reference signal sent by a base station and measuring the downlink positioning reference signal in combination with an uplink positioning reference signal according to downlink positioning reference signal resource configuration information and uplink positioning reference signal resource configuration information received from the LMF, and obtaining a positioning measurement and measurement quality of a combination of uplink and downlink at a terminal side;

sending the positioning measurement and the measurement quality of the combination of uplink and downlink at the terminal side to the LMF as a positioning report.

8. The method according to claim 7, wherein
the downlink reference signal comprises one or a combination of: a New Radio Positioning Reference Signal, NR PRS; a Channel State Information-Reference Signal, CSI-RS;
or a Synchronization Signal Block, SSB;
the uplink reference signal comprises an Up-Link Sounding Reference Signal, UL SRS.

9. The method according to claim 6, wherein
if the positioning scheme is a downlink-based positioning scheme, the sending the positioning related information comprises:
sending a downlink positioning reference signal to a terminal according to downlink positioning reference signal resource configuration information received from the LMF;
or
if the positioning scheme is an uplink-based positioning scheme, the sending the positioning related information comprises:
receiving and measuring an uplink positioning reference signal sent by a terminal according to uplink positioning reference signal resource configuration information received from the LMF, and obtaining an uplink positioning measurement and measurement quality;
reporting the uplink positioning measurement and the measurement quality to the LMF as a positioning report;
or
if the positioning scheme is an uplink-and-downlink-based positioning scheme, the sending the positioning related information comprises:
receiving an uplink positioning reference signal sent by a terminal and measuring the uplink positioning reference signal in combination with a sending moment of a downlink positioning reference signal according to downlink positioning reference signal resource configuration information and uplink positioning reference signal resource configuration information received from the LMF, and obtaining a positioning measurement and measurement quality of a combination of uplink and downlink at a base station side;
sending the positioning measurement and the measurement quality of the combination of uplink and downlink at the base station side to the LMF as a positioning report.

10. An information communication device, comprising:
a memory configured to store program instructions;
a processor configured to invoke the program instructions stored in the memory, and execute according to stored program instructions:
determining positioning reference signal resource configuration information and a positioning scheme through a negotiation process between a Location Management Function, LMF, and other node; wherein the negotiation process is an interaction process of positioning related information;
notifying the other node of the positioning reference signal resource configuration information and the positioning scheme;
wherein when determining positioning reference signal resource configuration information and a positioning scheme through a negotiation process between a LMF and other node, the processor is configured to:
determine first positioning reference signal resource configuration information and a first positioning scheme according to a first predefined criterion for a first negotiation process;
judge whether current positioning reference signal resource configuration information and/or positioning scheme is reasonable according to a second predefined criterion for a non-first negotiation process, and determine to adopt reasonable current positioning reference signal resource configuration information and/or positioning scheme;
wherein the reasonable current positioning reference signal resource configuration information is the first positioning reference signal resource configuration information, or second positioning reference signal resource configuration information re-determined according to a third predefined criterion; and the reasonable current positioning scheme is the first positioning scheme, or a second positioning scheme re-determined according to the third predefined criterion;
wherein when notifying the other node of the positioning reference signal resource configuration information and the positioning scheme, the processor is configured to:
notify the other node of the reasonable current positioning reference signal resource configuration information and current positioning scheme determined according to the second predefined criterion;
if it is determined that the current positioning reference signal resource configuration information is unreasonable according to the second predefined criterion, determine the second positioning reference signal resource configuration information and/or the second positioning scheme according to the third predefined criterion.

11. The information communication device according to claim 10, wherein the other node comprises a terminal and/or a base station.

12. The information communication device according to claim 10, wherein the processor is further configured to:
receive a positioning report sent by the other node, wherein the positioning report is obtained by the other node through measuring a positioning reference signal based on the positioning reference signal resource configuration information.

13. The information communication device according to claim 12, wherein the processor is further configured to:
determine a terminal location based on the positioning report;
wherein the positioning report comprises a positioning measurement and measurement quality obtained by the other node via measuring the positioning reference signal and reported by the other node.

14. The information communication device according to claim 10, wherein
the first predefined criterion comprises:
determining the first positioning reference signal resource configuration information according to lowest positioning performance of all terminals or a part of terminals covered by all base stations associated with the LMF as well as a preconfigured mapping relationship between positioning reference signal resources and positioning performance;

the second predefined criterion comprises:

determining that the second positioning reference signal resource configuration information and the second positioning scheme are reasonable in response to one or a combination of following conditions being satisfied; otherwise, determining that the second positioning reference signal resource configuration information and the second positioning scheme are unreasonable:

condition 1: measurement quality is higher than a preset measurement quality threshold;

condition 2: a measurement variance is less than a preset threshold of the measurement variance; or condition 3: a normalized relative position error between a calculation result of a terminal position obtained based on a third Generation Partnership Project positioning scheme and a calculation result of a terminal position obtained based on an Assisting-Global Navigation Satellite System positioning scheme is less than a preset position error threshold;

the third predefined criterion comprises:

determining the second positioning reference signal resource configuration information and/or the second positioning scheme according to actual positioning performance of a terminal in a base station associated with the LMF as well as a preconfigured mapping relationship between positioning reference signal resources and positioning performance of positioning schemes.

15. An information communication device, comprising:
a memory configured to store program instructions;
a processor configured to invoke the program instructions stored in the memory, and execute according to stored program instructions:

receiving positioning reference signal resource configuration information and a positioning scheme sent by a LMF; wherein the positioning reference signal resource configuration information and the positioning scheme are determined through a negotiation process between the LMF and other node; wherein the negotiation process is an interactive process of positioning related information;

sending the positioning related information based on the positioning reference signal resource configuration information and a type of the positioning scheme;

wherein the positioning scheme is one of following schemes:

a downlink-based positioning scheme;
an uplink-based positioning scheme; or
an uplink-and-downlink-based positioning scheme;

wherein the positioning reference signal resource configuration information and the positioning scheme are determined through the negotiation process between the LMF and other node by:

determining first positioning reference signal resource configuration information and a first positioning scheme according to a first predefined criterion for a first negotiation process;

judging whether current positioning reference signal resource configuration information and/or positioning scheme is reasonable according to a second predefined criterion for a non-first negotiation process, and determining to adopt reasonable current positioning reference signal resource configuration information and/or positioning scheme;

wherein the reasonable current positioning reference signal resource configuration information is the first positioning reference signal resource configuration information, or second positioning reference signal resource configuration information re-determined according to a third predefined criterion; and the reasonable current positioning scheme is the first positioning scheme, or a second positioning scheme re-determined according to the third predefined criterion;

wherein if it is determined that the current positioning reference signal resource configuration information is unreasonable according to the second predefined criterion, the second positioning reference signal resource configuration information and/or the second positioning scheme is determined according to the third predefined criterion.

16. The information communication device according to claim 15, wherein if the positioning scheme is a downlink-based positioning scheme, the sending the positioning related information comprises:

receiving and measuring a downlink positioning reference signal sent by a base station according to downlink positioning reference signal resource configuration information received from the LMF, and obtaining a downlink positioning measurement and measurement quality;

sending the downlink positioning measurement and the measurement quality to the LMF as a positioning report;

or if the positioning scheme is an uplink-based positioning scheme, the sending the positioning related information comprises:

sending an uplink positioning reference signal to a base station according to uplink positioning reference signal resource configuration information received from the LMF or the base station;

or if the positioning scheme is an uplink-and-downlink-based positioning scheme, the sending the positioning related information comprises:

receiving a downlink positioning reference signal sent by a base station and measuring the downlink positioning reference signal in combination with an uplink positioning reference signal according to downlink positioning reference signal resource configuration information and uplink positioning reference signal resource configuration information received from the LMF, and obtaining a positioning measurement and measurement quality of a combination of uplink and downlink at a terminal side;

sending the positioning measurement and the measurement quality of the combination of uplink and downlink at the terminal side to the LMF as a positioning report.

17. The information communication device according to claim 16, wherein the downlink reference signal comprises one or a combination of: a New Radio Positioning Reference Signal, NR PRS; a Channel State Information-Reference Signal, CSI-RS;

or a Synchronization Signal Block, SSB;

the uplink reference signal comprises an Up-Link Sounding Reference Signal, UL SRS.

18. The information communication device according to claim 15, wherein
- if the positioning scheme is a downlink-based positioning scheme, the sending the positioning related information comprises:
- sending a downlink positioning reference signal to a terminal according to downlink positioning reference signal resource configuration information received from the LMF;
- or
- if the positioning scheme is an uplink-based positioning scheme, the sending the positioning related information specifically comprises:
- receiving and measuring an uplink positioning reference signal sent by a terminal according to uplink positioning reference signal resource configuration information received from the LMF, and obtaining an uplink positioning measurement and measurement quality;
- reporting the uplink positioning measurement and the measurement quality to the LMF as a positioning report;
- or
- if the positioning scheme is an uplink-and-downlink-based positioning scheme, the sending the positioning related information comprises:
- receiving an uplink positioning reference signal sent by a terminal and measuring the uplink positioning reference signal in combination with a sending moment of a downlink positioning reference signal according to downlink positioning reference signal resource configuration information and uplink positioning reference signal resource configuration information received from the LMF, and obtaining a positioning measurement and measurement quality of a combination of uplink and downlink at a base station side;
- sending the positioning measurement and the measurement quality of the combination of uplink and downlink at the base station side to the LMF as a positioning report.

* * * * *